US009221704B2

(12) United States Patent
D'Agostini et al.

(10) Patent No.: US 9,221,704 B2
(45) Date of Patent: Dec. 29, 2015

(54) THROUGH-PORT OXY-FUEL BURNER

(75) Inventors: Mark Daniel D'Agostini, Allentown, PA (US); Michael Edward Habel, Charlotte, NC (US); Matthew James Watson, Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 997 days.

(21) Appl. No.: 13/296,624

(22) Filed: Nov. 15, 2011

(65) Prior Publication Data

US 2013/0122442 A1   May 16, 2013

(51) Int. Cl.
| | |
|---|---|
| F23D 14/46 | (2006.01) |
| C03B 5/235 | (2006.01) |
| F23D 14/66 | (2006.01) |
| F23D 14/22 | (2006.01) |
| F23D 14/32 | (2006.01) |
| F23D 14/48 | (2006.01) |
| F23D 14/78 | (2006.01) |

(52) U.S. Cl.
CPC ............... *C03B 5/2353* (2013.01); *F23D 14/22* (2013.01); *F23D 14/32* (2013.01); *F23D 14/48* (2013.01); *F23D 14/66* (2013.01); *F23D 14/78* (2013.01); *F23C 2201/20* (2013.01); *Y02E 20/344* (2013.01)

(58) Field of Classification Search
CPC ......... F23D 14/22; F23D 14/32; F23D 14/38; F23D 14/48; F23D 14/52; F23D 14/64; C03B 5/235; C03B 5/2353
USPC ............. 432/13, 173, 180; 431/175, 354, 160
See application file for complete search history.

(56) References Cited

U.S. PATENT DOCUMENTS

| | | | | |
|---|---|---|---|---|
| 2,546,937 | A * | 3/1951 | Wyandt et al. | 266/226 |
| 3,236,281 | A * | 2/1966 | Bain et al. | 75/516 |
| 3,515,529 | A * | 6/1970 | Love et al. | 65/27 |
| 3,638,932 | A * | 2/1972 | Masella et al. | 239/132.3 |
| 3,847,564 | A * | 11/1974 | Marion et al. | 48/95 |
| 4,067,686 | A * | 1/1978 | Karpisek | 431/353 |
| 4,155,702 | A * | 5/1979 | Miller et al. | 431/353 |
| 4,358,266 | A * | 11/1982 | Pont et al. | 431/90 |
| 4,523,530 | A * | 6/1985 | Kaminaka et al. | 110/264 |
| 4,927,357 | A * | 5/1990 | Yap | 432/22 |

(Continued)

FOREIGN PATENT DOCUMENTS

| | | |
|---|---|---|
| CN | 2800078 Y | 7/2006 |
| CN | 1902439 A | 1/2007 |

(Continued)

OTHER PUBLICATIONS

R. S. Pont; "Throughport Burner Generates Heat Transfer Improvement"; Melting Technology, Glass; Oct. 1993; pp. 408-409.

(Continued)

*Primary Examiner* — Alissa Tompkins
*Assistant Examiner* — Nathaniel Herzfeld
(74) *Attorney, Agent, or Firm* — Larry S. Zelson

(57) ABSTRACT

A fluid-cooled through-port oxy-fuel burner for converting an air-fuel regenerator port from air-fuel combustion to oxy-fuel combustion and an associated furnace and method. The oxy-fuel burner is suitable for installing through a regenerator port neck. The burner has an elbow-like bend to accommodate the geometry of the regenerator port neck. The burner has a cooling fluid jacket, a fuel conduit, a first oxidant conduit, and optionally an oxidant staging conduit.

25 Claims, 14 Drawing Sheets

(56) References Cited

U.S. PATENT DOCUMENTS

| | | | |
|---|---|---|---|
| 5,147,438 A | | 9/1992 | Castelain et al. |
| 5,545,031 A | * | 8/1996 | Joshi et al. ............... 431/8 |
| 5,577,386 A | * | 11/1996 | Alary et al. ............. 60/742 |
| 5,743,723 A | * | 4/1998 | Iatrides et al. ............ 431/8 |
| 5,941,459 A | | 8/1999 | Brooker et al. |
| 5,975,886 A | * | 11/1999 | Philippe ............... 431/165 |
| 6,003,781 A | * | 12/1999 | Kwan ................. 239/132.3 |
| 6,007,326 A | | 12/1999 | Ryan, III et al. |
| 6,171,100 B1 | | 1/2001 | Joshi et al. |
| 6,582,218 B1 | * | 6/2003 | D'Agostini et al. ....... 431/181 |
| 6,978,726 B2 | | 12/2005 | Kobayashi et al. |
| 7,143,610 B2 | | 12/2006 | Cabrera-Llanos et al. |
| 2003/0143502 A1 | * | 7/2003 | Heier et al. ............... 431/8 |
| 2004/0107883 A1 | | 6/2004 | Cabrera-Llanos et al. |
| 2006/0035184 A1 | | 2/2006 | D'Agostini |
| 2006/0057517 A1 | * | 3/2006 | Joshi et al. ............... 431/12 |
| 2007/0048679 A1 | * | 3/2007 | Joshi et al. ............... 431/8 |
| 2007/0295032 A1 | | 12/2007 | Scott et al. |
| 2010/0313604 A1 | * | 12/2010 | Watson et al. ............ 65/136.3 |
| 2012/0100496 A1 | | 4/2012 | Boer et al. |

FOREIGN PATENT DOCUMENTS

| | | |
|---|---|---|
| CN | 101363623 A | 2/2009 |
| EP | 0532825 A3 | 3/1992 |
| JP | 11-257613 | 9/1999 |
| JP | 2008-101882 | 5/2008 |
| RU | 2327655 C2 | 6/2008 |
| SU | 1698571 A1 | 12/1991 |
| TW | 432183 B | 5/2001 |
| TW | 200628424 | 8/2006 |
| TW | I265257 B | 11/2006 |
| UA | 18314 U | 11/2006 |
| WO | 2009003097 A2 | 12/2008 |

OTHER PUBLICATIONS

Glass; vol. 61, No. 6; Jun. 1984; pp. 191-192.

Laidlaw Drew Quote; Jan. 2001; 10 pgs.

Laidlaw Drew; Throughport Gas Firing Systems; Jul. 2001; 8 pgs; http://www.laidlaw-drew.co.uk/technical/flatflame.html.

* cited by examiner

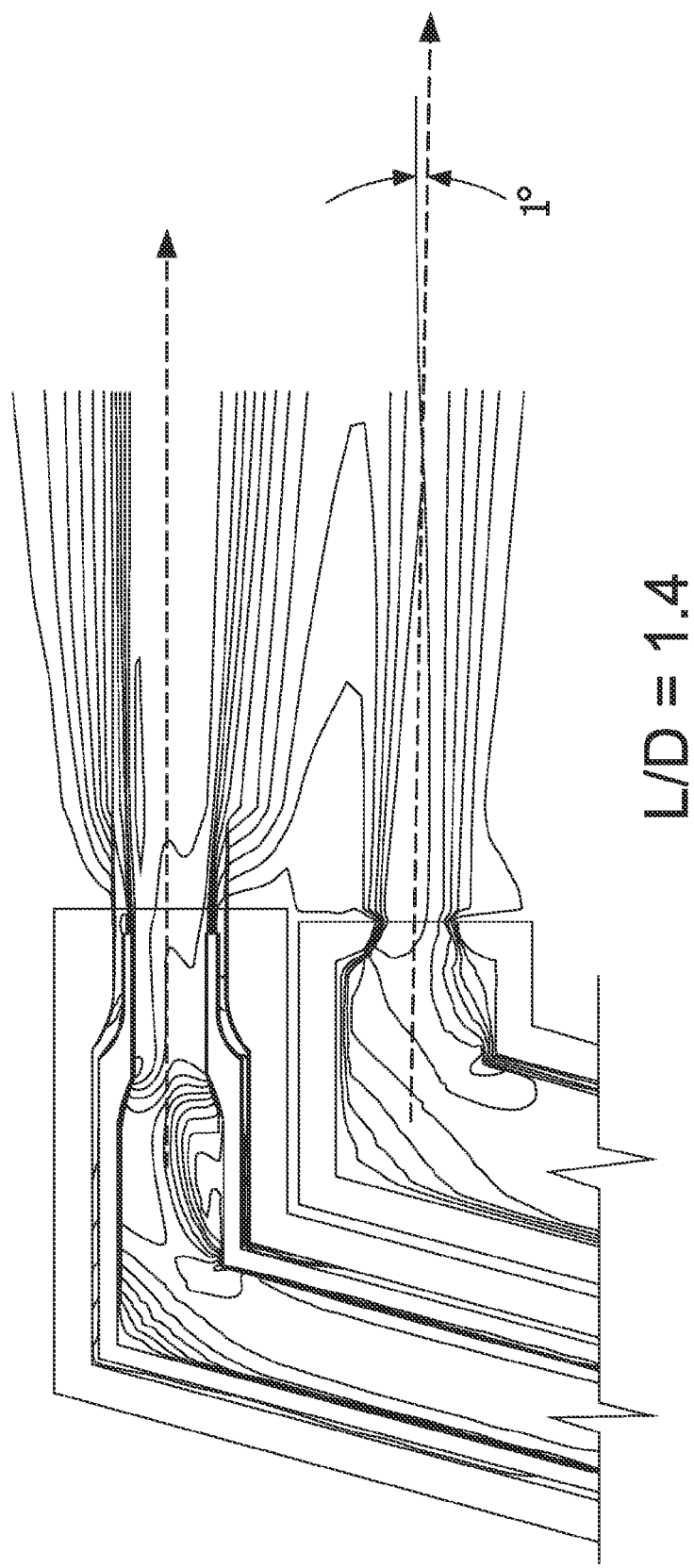

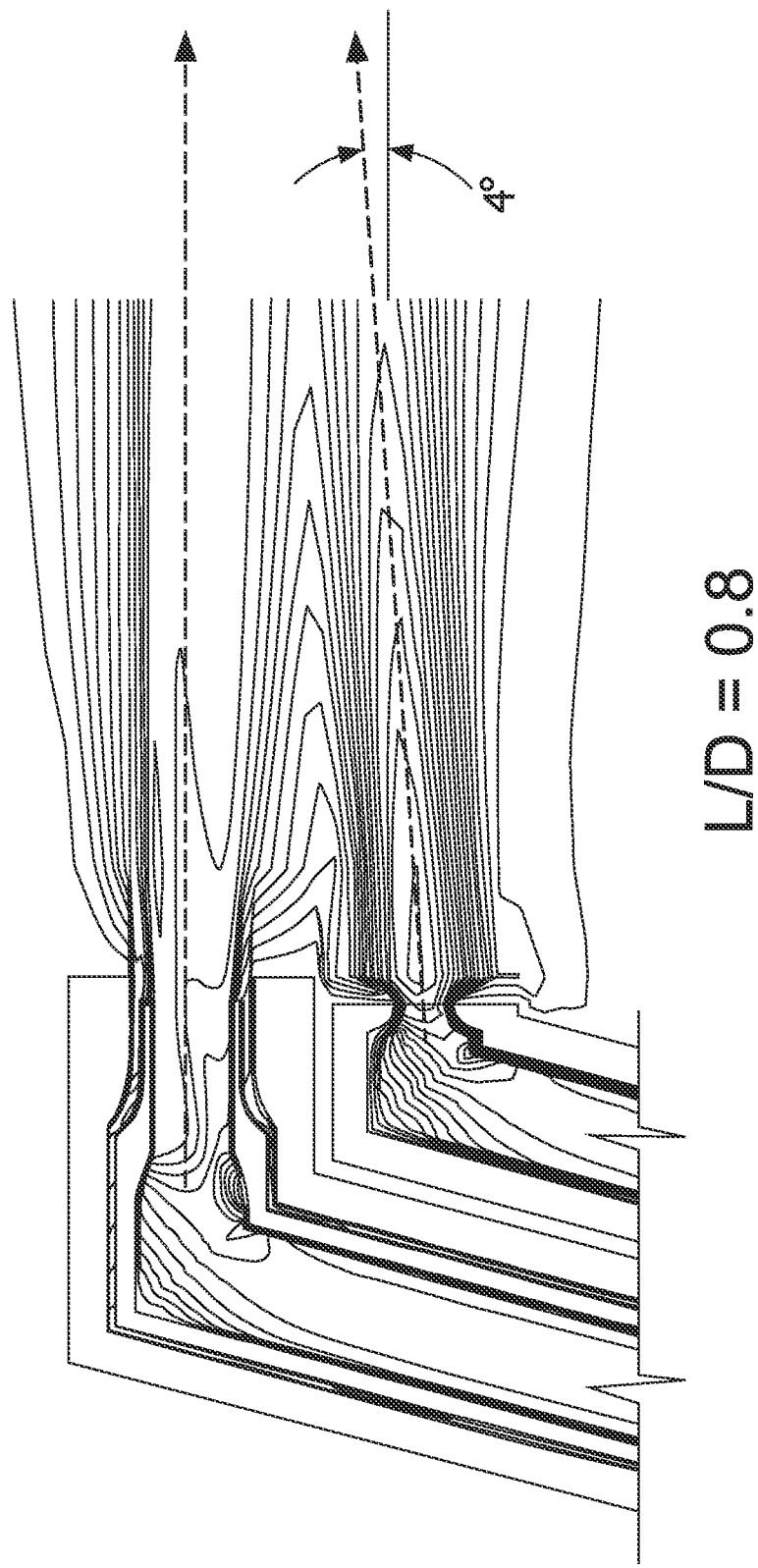
FIG. 8b  L/D = 0.8

THROUGH-PORT OXY-FUEL BURNER

CROSS-REFERENCE TO RELATED APPLICATIONS

This application claims the benefit of Provisional Application No. 61/184,944, filed Jun. 8, 2009. The disclosure of the Provisional Application is hereby incorporated by reference.

BACKGROUND OF THE INVENTION

The present invention relates to oxy-fuel burners for use in high temperature furnaces, for example glass furnaces.

Air-fuel fired regenerative glass furnaces are well-known. Regenerative glass furnaces have multiple air-fuel regenerator ports for producing combustion flames for glass melting. Basic design features of glass furnaces are described in various references, for example "Glass Furnaces, Design Construction and Operation," by Wolfgang Trier, translated by K. L. Loewenstein, Society of Glass Technology, Sheffield, UK, 2000, and "The Handbook of Glass Manufacture," $3^{rd}$ Ed. Vols. 1 & 2, by Fay Tooley (ed.), Ashlee Publishing Co. (New York), 1984, both incorporated herein by reference.

Conversion of one or more regenerator ports to oxy-fuel firing may be desired to retrofit the furnace to a hybrid furnace such as described in U.S. Pat. No. 6,519,973, incorporated herein by reference.

Terminating air-fuel firing and replacing energy input with oxy-fuel firing has its challenges. Since the furnace was initially designed as an air-fuel furnace, it is difficult to find suitable locations to place oxy-fuel burners. One location where oxy-fuel burners have been installed is in the port neck of the regenerator port.

The back of the port may be blocked off or otherwise obstructed to restrict or prevent flow of hot air from the regenerator into the port. A hole may be made in the top, bottom or sides of the port neck for the oxy-fuel burner installation. The oxy-fuel burner is then inserted through this hole and into the port neck. The oxy-fuel burner has to be designed to discharge fuel and oxygen into the furnace combustion space. This requires that the burner have an elbow or bend to change the direction of the flow of the fuel and oxidant. A problem with installing a burner through the port neck is that the size of the hole for inserting the burner is small in order to maintain the structural integrity of the port neck.

When the burner is installed through a hole in the top or bottom of the regenerator port neck, the burner will have a generally vertical section to convey the fuel and oxygen through the hole and a generally horizontal section to discharge the fuel and oxygen into the combustion space of the glass furnace with an elbow section between the generally vertical section and the generally horizontal section. When the burner is installed through a side wall of a regenerator port neck, the burner may have two generally horizontal sections with an elbow section between the two generally horizontal sections.

A problem with installing an oxy-fuel burner in the regenerator port neck is that the oxy-fuel burner will need to have the discharge nozzle close to the elbow section which requires an abrupt or marked change in the flow direction at a position close to the discharge nozzle. A long horizontal section terminating in the discharge nozzle within the port is problematic because of space limitations in the regenerator port. In addition, a long horizontal section terminating in the discharge nozzle is problematic because it would require a large hole cut in the wall of the port that may impact the structural steel surrounding the port. The abrupt or marked change in flow direction at a position close to the discharge nozzle causes high pressure drop, and turbulence of the flow leaving the nozzle. Turbulence causes rapid mixing and consequently combustion close to the nozzle resulting in short flames. Combustion close to the nozzle is undesirable because of nozzle overheating and, when the burner is used as a through-port burner, overheating of the refractory in the port neck.

BRIEF SUMMARY OF THE INVENTION

The present invention relates to a burner suitable for converting air-fuel firing using a regenerator port to oxy-fuel firing, while solving the aforementioned problems. The present invention also relates to a furnace with the burner and method of heating a furnace using the burner. The method may be used during a regenerator repair, to extend the life of the furnace, and/or to increase the production rate of an existing furnace.

The burner comprises a first cooling fluid jacket with an outer equivalent diameter, D, a first oxidant conduit disposed in fixed spaced relation to and generally concentrically within the first cooling fluid jacket, and a fuel conduit.

The first oxidant conduit has an inlet, a first portion downstream of the inlet of the first oxidant conduit, a bend portion downstream of the first portion of the first oxidant conduit, and a second portion downstream of the bend portion of the first oxidant conduit.

The bend portion has a bend angle, $\alpha$, of 45° to 120°. The bend angle, $\alpha$, may be 60° to 110°.

The second portion of the first oxidant conduit terminates in an outlet end and has a flow axis and a length, L. The second portion may have a circular cross section.

The fuel conduit has an inlet, a first portion downstream of the inlet, a bend portion, and a second portion. The first portion of the fuel conduit is disposed in fixed spaced relation to and generally concentrically within the first portion of the first oxidant conduit. The bend portion of the fuel conduit is disposed in fixed spaced relation to and generally concentrically within the bend portion of the oxidant conduit. The second portion of the fuel conduit terminates in an outlet end and has a flow axis. The second portion of the fuel conduit is disposed in fixed spaced relation to and generally concentrically within the second portion of the first oxidant conduit. The second portion of the fuel conduit may have a circular cross section.

The flow axis of the second portion of the first oxidant conduit may be straight and may be substantially parallel or substantially coincident with the flow axis of the second portion of the fuel conduit.

An oxidant passage is formed or defined between the second portion of the fuel conduit and the second portion of the first oxidant conduit. The oxidant passage has an inlet section, a transition section downstream of the inlet section, and an outlet section downstream of the transition section. The inlet section has a cross-sectional area, $A_i$. The outlet section has a cross-sectional area, $A_o$.

L/D ranges from 0.8 to 7 or ranges from 1.4 to 7, and $$\frac{A_i}{A_o}$$

ranges from 1.3 to 5.

The second portion of the first oxidant conduit may have a convex inner surface in the transition section of the oxidant passage.

The second portion of the fuel conduit defines a fuel passage wherein the fuel passage has an inlet section, a transition section downstream of the inlet section, and an outlet section downstream of the transition section. The inlet section of the second portion of the fuel conduit has a cross sectional area, $A_{fi}$, and the outlet section of the second portion of the fuel conduit has a cross section area, $A_{fo}$, wherein $$\frac{A_{fi}}{A_{fo}}$$

may be from 1.0 to 5 or from 1.37 to 5.

The second portion of the fuel conduit may have a concave outer surface in the transition section of the oxidant passage.

The second portion of the fuel conduit may have a concave inner surface and a convex inner surface in the transition section of the fuel passage, wherein the convex inner surface of the fuel conduit is downstream of the concave inner surface of the fuel conduit.

The outlet end of the second portion of the first oxidant conduit may protrude from the outlet end of the second portion of the fuel conduit by 0.2 cm to 3 cm.

The burner may further comprise a second oxidant conduit in fixed spaced relation to the second portion of the first oxidant conduit.

The second oxidant conduit may be disposed in fixed spaced relation to and generally concentrically within the first cooling fluid jacket. The burner may further comprise a second cooling fluid jacket and the second oxidant conduit may be disposed in fixed spaced relation to and generally concentrically within the second cooling fluid jacket. The second oxidant conduit may have an inlet, a first portion downstream of the inlet of the second oxidant conduit, a bend portion downstream of the first portion of the second oxidant conduit and a second portion downstream of the bend portion of the second oxidant conduit.

The bend portion of the second oxidant conduit has a bend angle, $\beta$, the bend angle $\beta$ within 15° of the bend angle $\alpha$, and a second portion downstream of the bend portion of the second oxidant conduit, the second portion of the second oxidant conduit terminating in a nozzle and having a flow axis, the second portion of the second oxidant conduit in fixed spaced relation to the second portion of the first oxidant conduit.

The bend angle, $\beta$ may be within 2° of the bend angle, $\alpha$, and the flow axis of the second portion of the second oxidant conduit may be substantially parallel to the flow axis of the second portion of the first oxidant conduit.

The nozzle of the second oxidant conduit has an inlet and an outlet. The outlet end of the second portion of the first oxidant conduit may protrude from the outlet of the nozzle of the second portion of the second oxidant conduit by 0.2 cm to 3 cm. The inlet may have a circular cross section and a cross-sectional area, $A_{ni}$, and the outlet may have a non-circular cross section and a cross-sectional area, $A_{no}$, wherein $$\frac{A_{ni}}{A_{no}}$$

may range from 1.25 to 5.

The nozzle of the second oxidant conduit may have a convergent height and a divergent width.

The nozzle of the second oxidant conduit may have a convex surface transitioning between the circular cross section and the non-circular cross section.

The furnace comprises a regenerator, a furnace combustion chamber and a regenerator port neck connecting the regenerator to the furnace combustion chamber. The regenerator port neck defines a port and a port opening in a wall of the furnace. The furnace also comprises a burner according to the features described above. The burner penetrates through the regenerator port neck and into the port and the burner is arranged to direct a fuel and an oxidant gas through the port opening and into the furnace.

The furnace also comprises a melting tank basin arranged below and adjoining the furnace combustion chamber, a charge end for introducing glass-forming ingredients into the melting tank basin, and a discharge end for withdrawing a glass product from the melting tank basin. The furnace also comprises an exhaust port in a wall of the furnace for withdrawing combustion products from the furnace combustion chamber.

In an embodiment, the second oxidant conduit penetrates the furnace wall at a position underneath the port opening and is arranged to direct the oxidant into the furnace.

The method of heating a furnace comprises obstructing a flow of air to the port, terminating a flow of a fuel to an air-fuel burner associated with the port, installing a burner as described above so that the burner penetrates through the regenerator port neck and into the port, passing a coolant through the first cooling fluid jacket and, if present, through the second cooling fluid jacket, introducing a first oxidant gas into the furnace through the first oxidant conduit, and introducing the fuel or another fuel into the furnace through the fuel conduit, combusting the fuel or the other fuel with the first oxidant gas to form combustion products and withdrawing the combustion products from the furnace combustion chamber through an exhaust.

The method may comprise continuing air flow through the port in an amount greater than 5% to less than or equal to 25% of the stoichiometric air required for combustion of fuel passing through the burner.

The method may further comprise introducing the first oxidant gas or a second oxidant gas into the furnace through a second oxidant conduit to combust the fuel or the other fuel.

BRIEF DESCRIPTION OF SEVERAL VIEWS OF THE DRAWINGS

FIG. 8a is a contour plot of velocity magnitude from modeling results.

FIG. 8b is a contour plot of velocity magnitude from modeling results.

DETAILED DESCRIPTION OF THE INVENTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

The phrase "at least a portion" means "a portion or all."

For the purposes of simplicity and clarity, detailed descriptions of well-known devices, circuits, and methods are omitted so as not to obscure the description of the present invention with unnecessary detail.

The present invention relates to a burner. More specifically the invention relates to an oxy-fuel burner used to replace air-fuel firing with oxy-fuel firing in a glass furnace having air-fuel regenerator ports. The burner is particularly suited for at least partially converting a regenerator port from air-fuel firing to oxy-fuel firing. Because of the geometry of a glass furnace regenerator port, the burner used for such a conversion requires an abrupt or marked change in the flow direction at a position close to the discharge nozzle.

The regenerator port may be temporarily converted from air-fuel firing to oxy-fuel firing for cases where the associated regenerator needs to be repaired. The regenerator port may be converted to oxy-fuel firing on a more permanent basis to take advantage of oxy-fuel benefits. Several of the ports closest to the batch end of the glass furnace may be converted to oxy-fuel firing to improve batch melting by the oxy-fuel flames.

Figure 1:
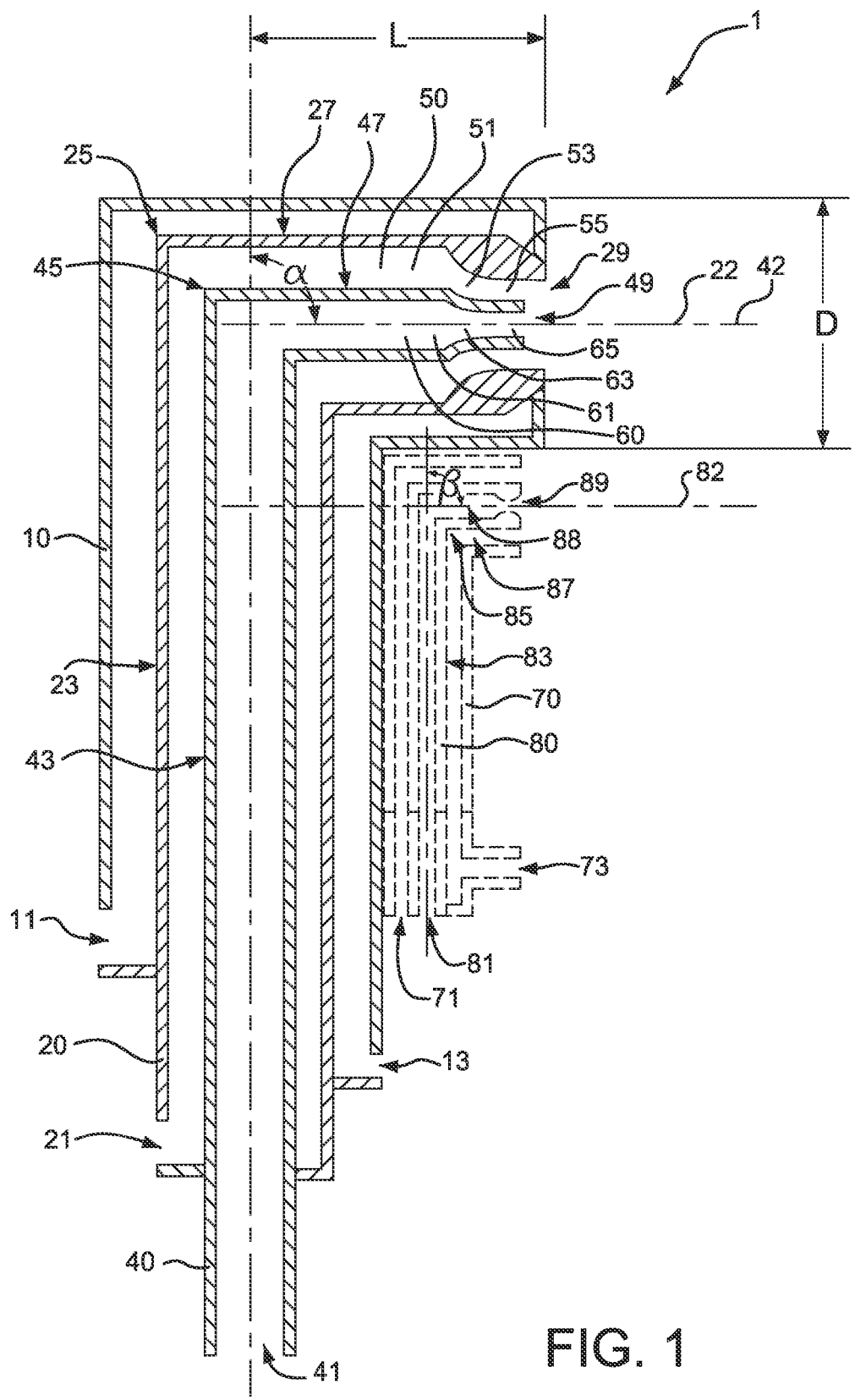
FIG. 1 shows a through-port burner with an optional in-port oxidant staging lance.
Figure 2:
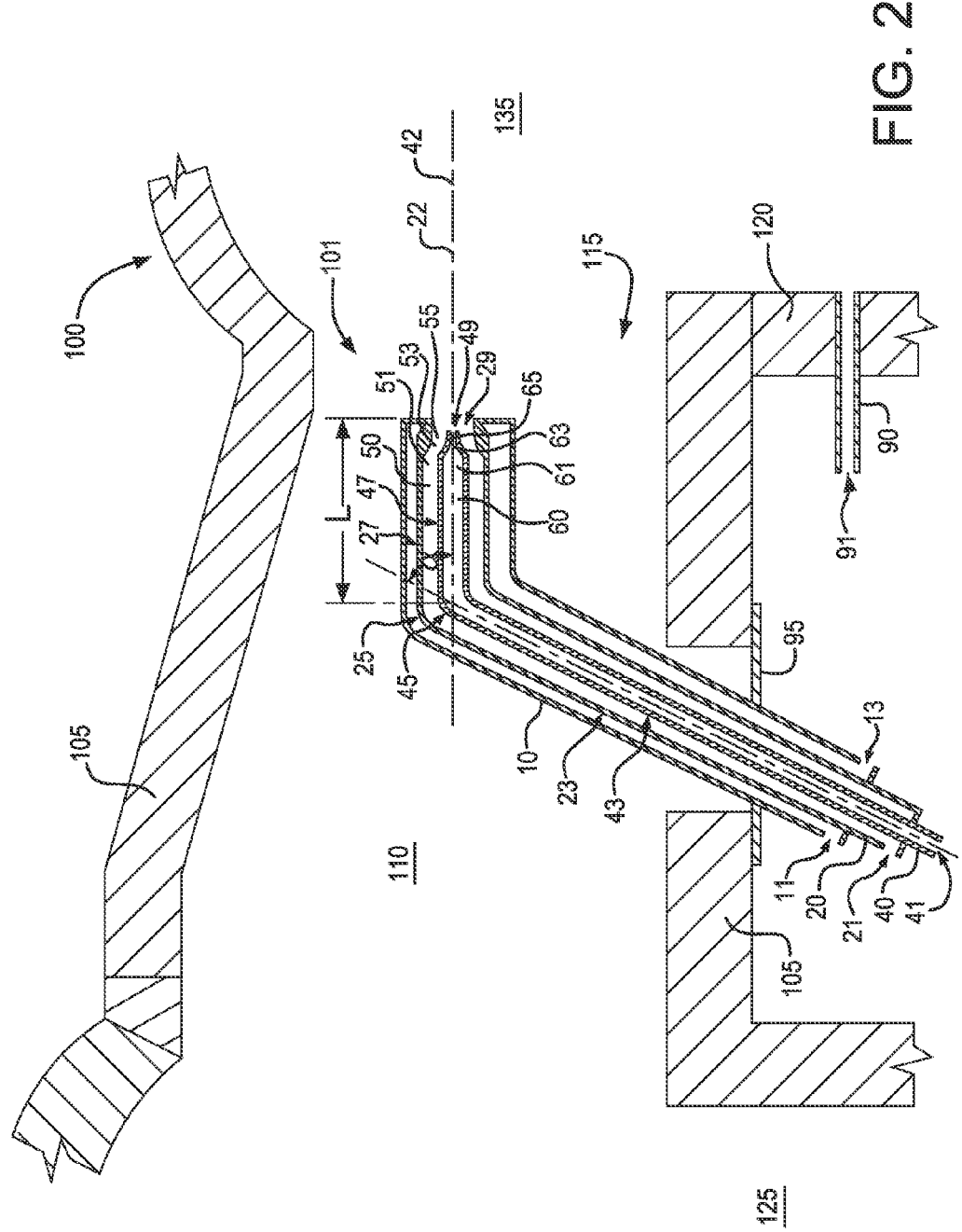
FIG. 2 shows a through-port burner installed in a regenerator port neck of a furnace with an underport oxidant staging lance.

Referring now to the drawings, wherein like reference numbers refer to like elements throughout the several views, FIG. 1 shows a burner 1 according to an embodiment of the invention and FIG. 2 shows a section of a furnace 100 comprising a regenerator port neck 105 and a burner 101 installed in the regenerator port neck.

Burners 1 and 101 comprise a first cooling fluid jacket 10, a first oxidant conduit 20 and a fuel conduit 40. The first cooling fluid jacket 10 has an outer equivalent diameter, D, which for the case of a circular cross-section is equal to the outer diameter and for a non-circular cross-section is equal to 4 times the outer cross-sectional area of the jacket divided by the outer perimeter. The first oxidant conduit 20 is disposed in fixed spaced relation to and generally concentrically within the first cooling fluid jacket 10 and the fuel conduit 40 is disposed in fixed spaced relation to and generally concentrically within the first oxidant conduit 20. Generally concentric means that the axis of one conduit is common with the axis of the other conduit or slightly displaced by up to 2 cm.

A cooling fluid jacket is an outer covering or casing, as a covering that encloses an intermediate space through which a temperature-controlling fluid can circulate. The cooling fluid may be water. Cooling fluid jackets, e.g. water-cooled jackets, are well-known in the art of burners and combustion. Details in the design of the cooling fluid jacket are not critical to the invention. One skilled in the art can readily select and/or modify an appropriate cooling fluid jacket design from those known in the art.

The first cooling fluid jacket 10 is required to prevent the burner from overheating. When the burner is inserted into a glass furnace regenerator port, heat from the furnace will radiate to the outer surface of the burner. When the burner is operated, the flame coming from the burner will radiate back to the burner. Water or other cooling fluid is introduced into the inlet 11 of the first cooling fluid jacket 10 and flows around the first oxidant conduit 20 including the area around the fuel and oxidant discharge end. The water or other cooling fluid is withdrawn from the outlet 13 of the first cooling fluid jacket 10.

As used herein, a conduit is any means for conveying a fluid, for example, a pipe, a tube, a duct or the like. The first cooling fluid jacket 10, the first oxidant conduit 20 and the fuel conduit 40 are fabricated from a metal, preferably a stainless steel. One skilled in the art may readily select suitable materials of construction for the burner.

An oxidant conduit is a conduit intended to convey an oxidant gas and connected to an oxidant supply. An oxidant gas is any gas comprising more than 21 vol. % oxygen. Industrial grade oxygen having an oxygen concentration of 80 vol. % to 100 vol. % is an oxidant gas, as is the gaseous vent stream from a nitrogen plant, typically having an oxygen concentration of 60 vol. % to 80 vol. %. Oxidants may also be blends of air and industrial or vent stream oxygen having oxygen concentration between 22 vol. % and 28 vol. % or between 28 vol. % and 60 vol. %. The oxidant conduit may be designed to convey industrial grade oxygen using materials compatible with industrial grade oxygen.

A fuel conduit is a conduit intended to convey a fuel. A fuel conduit is connected to a fuel supply. The fuel may be a gaseous fuel, for example, natural gas, propane or other gaseous hydrocarbons, hydrogen, carbon monoxide or combinations thereof. Or the fuel may be liquid, for example, No. 1 distillate oil, No. 2 distillate fuel oil, diesel fuel, biodiesel and it's by-products (such as glycerol), kerosene, No. 4 fuel oil, No. 5 residual oil, No. 6 residual fuel oil, Bunker-C type fuel oil and others known to a person of ordinary skill in the art. The liquid fuel may be atomized by any one of several means known to a person of ordinary skill in the art.

The first oxidant conduit 20 has an inlet 21 for receiving an oxidant gas, a first portion 23 downstream of the inlet 21, a bend portion 25 downstream of the first portion 23, and a second portion 27 downstream of the bend portion 25. The oxidant gas may be industrial grade oxygen.

Upstream and downstream are defined relative to the intended flow of a fluid, e.g. the fuel or oxidant. The upstream end corresponds to the end closest to the inlet where fluid is introduced into the device and the downstream end corresponds to the outlet or nozzle end where fluid exits the device.

The inlet 21 may include a quick disconnect fitting or other suitable fitting for plumbing the oxidant gas supply to the burner.

The first portion 23 may have a circular cross section. The first portion 23 may also have spacers to ensure concentricity between the first portion of the first oxidant conduit and the first portion of the fuel conduit.

The bend portion 25 has a bend angle, α, of 45° to 120°. The bend angle, α, may be 60° to 110°. The bend angle is defined as the supplementary angle of the included angle. The included angle, which is less than 180°, is the angle defined between a straight section of a first portion of a conduit and a straight section of a second portion of the conduit. The included angle for the first oxidant conduit is defined between a straight section of the first portion of the first oxidant conduit and a straight section of the second portion of the first oxidant conduit. The bend angle, α, as shown in FIG. 1 and FIG. 2, is the supplementary angle to the included angle for the first oxidant conduit. A bend angle of 0° corresponds to no bend i.e. straight. A bend angle of 180° corresponds to a "U-shaped" bend.

The bend in the bend portion 25 may be smooth, having a radius as shown in FIG. 2, or, as shown in FIG. 1, the bend may have a sharp angle.

The second portion 27 of the first oxidant conduit 20 terminates in an outlet end 29 and has a flow axis 22 and a length, L. The second portion 27 may have a circular cross section.

A flow axis corresponds to a line in the flow direction passing through the geometric centers of cross sections of the conduit, where the cross sections lie in planes perpendicular to the line. The flow axis may include a curved line. For this burner, at least a section of the flow axis is a straight line section.

For the purposes of this disclosure, the length, L, of the second portion of the first oxidant conduit corresponds to the straight line section of the flow axis between the bend portion and the outlet end as shown in FIG. 1 and FIG. 2.

The fuel conduit 40 has an inlet 41 for receiving a fuel, a first portion 43 downstream of the inlet 41, a bend portion 45, and a second portion 47.

The inlet 41 may include a quick disconnect fitting or other suitable fitting for plumbing the fuel supply to the burner.

As shown in FIG. 1 and FIG. 2, the first portion 43 of the fuel conduit 40 is disposed in fixed spaced relation to and generally concentrically within the first portion 23 of the first oxidant conduit 20. The bend portion 45 is disposed in fixed spaced relation to and generally concentrically within the bend portion 25.

The bend in the bend portion 45 may be smooth, having a radius as shown in FIG. 2, or have a sharp angle as shown in FIG. 1. The bend portion 45 will be compatible with the bend portion 25.

The second portion 47 terminates in an outlet end 49 and has a flow axis 42. The second portion 47 is disposed in fixed spaced relation to and generally concentrically within the second portion 27 of the first oxidant conduit 20. The second portion 47 may have a circular cross section.

The second portion 47 of the fuel conduit may be concentric with the second portion 27 of the first oxidant conduit 20 such that the flow axis 42 and the flow axis 22 are both straight and are substantially parallel or substantially coincident. The flow axis 42 and flow axis 22 are coincident in FIG. 1.

The term "parallel" means extending in the same direction, everywhere equidistant and not meeting. With regard to the flow axis 22 and the flow axis 42, substantially parallel means spaced apart with a maximum spacing distance deviation of 2 cm.

The term "coincident" means occupying the same space or location. With regard to the flow axis 22 and the flow axis 42, substantially coincident means coincident within 2 cm.

An oxidant passage 50 is formed or defined between the second portion 47 of the fuel conduit 40 and the second portion 27 of the first oxidant conduit 20. The oxidant passage 50 has an inlet section 51, a transition section 53 downstream of the inlet section 51, and an outlet section 55 downstream of the transition section 53. The inlet section 51 has a cross-sectional area, $A_i$. The outlet section 55 has a cross-sectional area, $A_o$. The cross-sectional area, $A_o$ is designed to provide an oxidant gas velocity of about 30 m/sec to about 150 m/s at the design oxidant gas flow rates.

The abrupt or marked change in the first oxidant flow direction at a position close to the discharge nozzle may be described by the relationship between the length, L, and the outer equivalent diameter, D, of the first cooling fluid jacket. It is desirable to maximize the ratio L/D to minimize non-uniformity in the velocity profile of the first oxidant at the discharge nozzle, since velocity non-uniformity is a primary cause of accelerated combustion near the discharge nozzle, which can lead to excessively high flame temperatures and, hence, burner damage or failure. However, a short length is needed for fitting of the burner assembly into the limited space available in a regenerator port of a glass furnace. The maximum allowable L/D based on available space is estimated at 7.0.

One solution to achieve an acceptable flow distribution with a short L/D is to place a static mixing device in the second portion of the first oxidant passage. A static mixing device is a stationary obstruction placed in the flow field that promotes flow redistribution, by locally increasing turbulent mixing and diffusion, generally through the dissipation of static pressure. A common example of a static mixing device is a perforated plate; that is, a plate that traverses the flow cross-section comprising a plurality of small holes distributed across the plate, and through which the flow must pass.

Unfortunately, both the dissipation of static pressure and the generation of turbulent mixing/diffusion are undesirable flow characteristics in this case. First, increasing the turbulence of the oxidant stream results in more rapid mixing between oxidant and fuel, which leads to an exacerbation of the problem of excessively high flame temperature near the burner nozzle. Secondly, the dissipation of static pressure leads to a higher supply pressure requirement for the oxidant. In some cases, the higher supply pressure requirement can not be met, while in other cases it adds considerable capital and operating cost to the installation due to the need to install and operate one or more gas compressors. For the embodiment of this burner comprising a second oxidant conduit in fixed space relation to the first oxidant conduit:

$$0.8 \leq \frac{L}{D} \leq 7.$$

For embodiments of the burner where the second oxidant conduit is not included:

$$1.4 \leq \frac{L}{D} \leq 7.$$

A feature of the present burner that tends to evenly distribute and straighten the flow of the oxidant and prevent early mixing of the oxidant and the fuel in the furnace without the aforementioned undesirable characteristics of a static mixing device is the reduction in the cross-sectional area of the oxidant passage 50 from the inlet section 51 to the outlet section 55. This reduction in cross-sectional area of the first oxidant passage is achieved through the transitional section 53. For improvement of first oxidant flow distribution, it is desirable to maximize the ratio of inlet to outlet cross-sectional area. However, for a given first oxidant velocity at the outlet, an increase in the ratio $$\frac{A_i}{A_o}$$

requires an increase in the size of the inlet cross-sectional area. The practical limits on the upper value of this ratio due to the constraint of available space in the regenerator port is $$\frac{A_i}{A_o} = 5.$$

For this burner, $$1.3 \le \frac{A_i}{A_o} \le 5.$$

Figure 3:
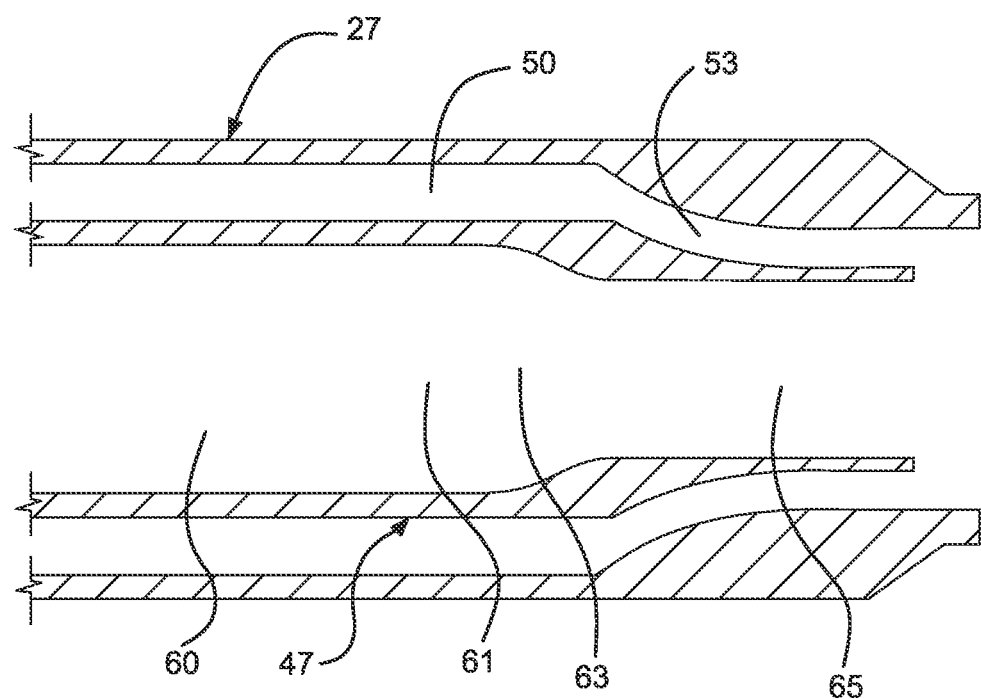
FIG. 3 shows an enlarged view of the discharge end of the first oxidant conduit and the fuel conduit.

As shown in FIG. 1, FIG. 2 and enlarged in FIG. 3, the second portion 27 of the oxidant conduit 20 may have a convex inner surface in the transition section 53 of the oxidant passage 50.

As shown in FIG. 1, FIG. 2 and enlarged in FIG. 3, the second portion 47 of the fuel conduit 40 may have a concave outer surface in the transition section 53 of the oxidant passage 50. These convex and concave curvatures help to straighten the flow of the oxidant so that it aligns with the axis 22 of the first oxidant stream as it approaches the outlet end 29, while simultaneously decreasing the generation and diffusion of turbulent eddies.

The second portion 47 of the fuel conduit 40 forms or defines a fuel passage 60. The fuel passage 60 has an inlet section 61, a transition section 63 downstream of the inlet section 61, and an outlet section 65 downstream of the transition section 63. The inlet section of the second portion of the fuel conduit has a cross sectional area, $A_{fi}$, and the outlet section of the second portion of the fuel conduit has a cross sectional area, $A_{fo}$.

Similar to the second portion of the first oxidant conduit, a feature of the burner that tends to straighten the flow of the fuel and prevent accelerated turbulent mixing of the oxidant and the fuel in the furnace is the reduction in the cross-sectional area of the fuel passage 60 from the inlet section 61 to the outlet section 65. For improvement of fuel flow distribution, it is desirable to maximize the ratio of inlet to outlet cross-sectional area. However, for a given fuel velocity at the outlet, an increase in the ratio $$\frac{A_{fi}}{A_{fo}}$$

requires an increase in the size of the inlet cross-sectional area. The practical limits on the upper value of this ratio due to the constraint of available space in the regenerator port is $$\frac{A_{fi}}{A_{fo}}$$

equal to 5. For this burner, $$1.0 < \frac{A_{fi}}{A_{fo}} \le 5 \text{ or } 1.37 \le \frac{A_{fi}}{A_{fo}} \le 5.$$

Based on the expected firing rates (i.e. fuel flow rates), the cross sectional area, $A_{fo}$, is designed to provide a fuel velocity of about 25 m/s to about 150 m/s.

As shown in FIG. 1 and in FIG. 2, the second portion 47 of the fuel conduit 40 may have a concave inner surface and a convex inner surface in the transition section of the fuel passage 60 where the convex inner surface is downstream of the concave inner surface of the fuel conduit 60. This geometry helps to realign the flow at the inner surface of the fuel passage with the flow axis 42 while minimizing the generation and diffusion of turbulent eddies in the fuel stream. By aligning the flows of first oxidant and fuel along their respective axes and simultaneously minimizing the generation and diffusion of turbulent eddies, these features act to reduce the rate of mixing of the fuel and oxidant as they discharge into the furnace. As previously stated, this is important to protecting the metal component of the burner from high temperature damage caused by a short oxy/fuel flame.

As shown in FIG. 1 and FIG. 2, the outlet end 29 of the second portion 27 of the oxidant conduit 20 protrudes from the outlet end 49 of the second portion 47 of the fuel conduit 40. The outlet end 29 may protrude from the outlet end 49 by 0.2 cm to 3 cm. Protrude means to jut out or extend outwardly from the surrounding surface or context.

The outlet end 49 of the fuel conduit 40 is recessed back from the outlet end 29 of the oxidant conduit 20 to protect the outlet end 49 from radiation from the flame coming from the burner and the high temperature environment of the glass furnace. The oxidant conduit 20 including the outlet end 29 of the oxidant conduit is cooled by the cooling fluid circulating through the first cooling fluid jacket 10.

The fuel conduit 40, on the other hand, is cooled by the flow of the oxidant passing through the oxidant passage. By recessing the outlet end 49, the outlet end 49 will be exposed to less thermal radiation and overheating may be avoided. In case the outlet end 49 is recessed too much, the fuel and oxidant may react within the burner causing damage to the burner due to overheating of the oxidant conduit. A proper balance between shielding the outlet end 49 from thermal radiation and mixing of the fuel and oxidant is provided by the outlet end 29 protruding from the outlet end 49 by 0.2 cm to 3 cm.

The burner may also include oxidant staging. Staging of oxidant in the context of this disclosure means to withhold a portion of the combustion oxygen from the first oxidant stream so that it may be delivered at a later "stage" of the combustion of the fuel. As shown in FIG. 1, the staging lance may be part of the burner placed in the regenerator port, called an in-port lance, and/or as shown in FIG. 2, the staging lance may be a separate part placed below the regenerator port, called an underport lance. Oxidant staging is found to provide a means of adjusting the flame in the furnace.

Staging oxygen acts to lower the peak temperature of the oxy/fuel flame. Lowering of the peak temperature reduces the risk of damage to the burner due to high temperature and also reduces the rate of fuel and oxidant mixing. Reduction of the fuel and oxidant mixing rate slows the combustion process thereby resulting in a longer flame, which is more desirable. Moreover, staging creates a region of fuel-rich or oxygen-lean combustion within the flame. The fuel-rich region promotes the formation of carbon-rich solid particles (soot) that enhance radiant heat transfer from the flame to the glass melt, and also leads to lower emissions of NOx. There is a practical limit, however, to the degree of staging that can be safely and effectively employed. This limit will typically be set by the momentum of the flame, which decreases as the amount of staging oxygen is increased. If the flame momentum is too low, the flame will become unstable in the furnace and could, for example, loft toward the furnace crown (roof) where it could damage the crown refractory.

The placement and orientation of the staging oxygen also affects the flame from the burner. Staging oxidant that is introduced immediately beneath the first oxidant/fuel nozzle has certain desirable features. For example, staging oxidant introduced in this location mixes with the fuel just downstream of the burner nozzle, and hence is substantially undiluted by furnace gas. Moreover, staging in this location is effective in enhancing the combustion of the lower portion of the main burner flame. This results in radiant energy from the flame being preferentially directed downward toward the glass melt, rather than upward toward the crown. If there is concern of overheating the port, the in-port staging nozzle can be directed downward toward the port floor where it provides convective cooling of that surface. Alternatively, if there is insufficient room available for accommodating both the burner nozzle and lance within the port, then it is permissible to locate a staging oxygen nozzle elsewhere, for example, beneath the port but above the surface of the glass melt.

Figure 5:
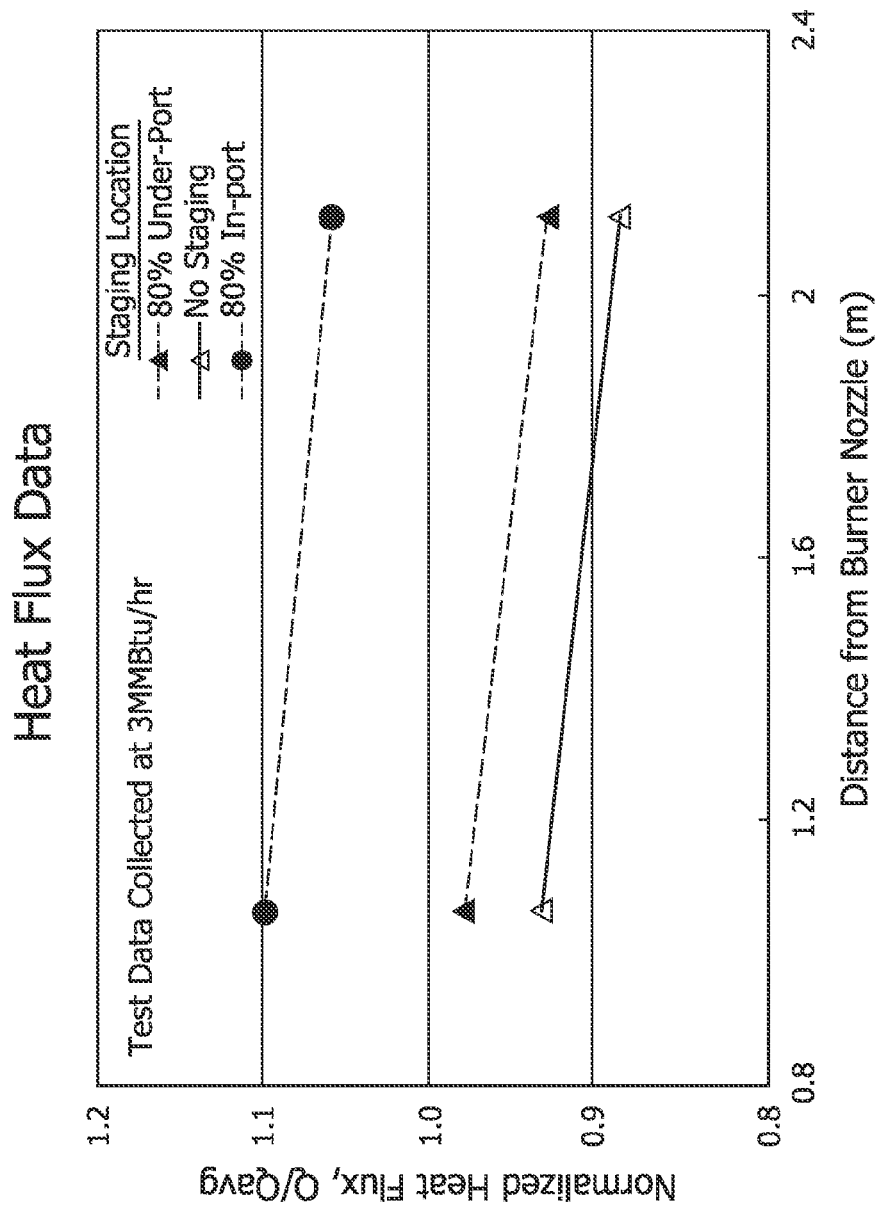
FIG. 5 is a plot of normalized heat flux as a function of distance from the burner nozzle in a test furnace.

Including oxidant staging both under the regenerator port and in the regenerator port gives the operator flexibility to affect heating of the glass melt, overheating of the regenerator port refractory and pollutant emissions such as NOx. Experiments were carried out in a single-port test furnace. Experimental results verified the substantial effect of the amount and location of oxidant staging on heat transfer, port temperature, and furnace roof temperature. FIG. 5, for example, indicates a much larger heat flux to the furnace floor is achieved with 80% in-port oxidant staging compared to "no staging" and 80% under-port staging cases. While these data provide representative trends, the optimal amount and location of oxidant staging is best determined based on specific furnace geometry and operating conditions.

As shown in FIG. 2, the burner may include an underport oxidant staging lance 90 that is placed in fixed spaced relation to the second portion 27 of the first oxidant conduit 20. The underport oxidant staging lance is used to direct a stream of oxidant under a flame produced by the introduction of fuel and oxidant from the fuel conduit 40 and first oxidant conduit 20, respectively.

The underport oxidant staging lance 90 has an inlet 91 for receiving the first oxidant gas or a second oxidant gas. The first oxidant gas and the second oxidant gas may be industrial grade oxygen from the same or different sources.

The inlet 91 may include a quick disconnect fitting or other suitable fitting for plumbing the oxidant gas supply to the underport oxidant staging lance 90.

The underport oxidant staging lance 90 may not need a cooling fluid jacket. The flow of the oxidant gas through the underport oxidant staging lance may be sufficient to keep the nozzle of the underport oxidant staging lance cool. The oxidant gas introduced into the underport oxidant staging lance 90 will generally be the same oxidant gas that is introduced into the first oxidant conduit 20, for example industrial grade oxygen. However, the oxidant gas introduced into the underport oxidant staging lance may be a different oxidant gas than that introduced into the first oxidant conduit 20.

The burner may include an in-port oxidant staging lance shown in FIG. 1 as second oxidant conduit 80 which is placed in fixed spaced relation to the second portion 27 of the first oxidant conduit 20. The second oxidant conduit 80 is used to direct a stream of oxidant under the flame.

Since the in-port oxidant staging lance is in the regenerator port, it will require cooling. The second oxidant conduit 80 may be disposed in fixed spaced relation to and generally concentrically within the first cooling fluid jacket 10 or an optional second cooling fluid jacket 70 as shown in FIG. 1.

The burner may further comprise an optional second cooling fluid jacket 70 and a second oxidant conduit 80 disposed in fixed spaced relation to and generally concentrically within the optional second cooling fluid jacket 70. The second cooling fluid jacket 70 may be required to prevent the nozzle of the oxidant lance from overheating because of radiant heating from the flame and the furnace. Water or other cooling fluid is introduced into the inlet 71 of the optional second cooling fluid jacket 70 and flows around the second oxidant conduit 80 including the area around the oxidant discharge end. The water or other cooling fluid is withdrawn from the outlet 73 of the optional second cooling fluid jacket 70.

The second oxidant conduit 80 has an inlet 81 for receiving the oxidant gas or a second oxidant gas, a first portion 83 downstream of the inlet 81, a bend portion 85 downstream of the first portion 83, and a second portion 87 downstream of the bend portion 85. The first oxidant gas and the second oxidant gas may be industrial grade oxygen from the same or different sources.

The inlet 81 may include a quick disconnect fitting or other suitable fitting for plumbing the oxidant gas supply to the oxidant lance for the burner.

The first portion 83 may have a circular cross section, and may be physically attached, for example by welding, to the outer surface of the first portion of the first oxidant nozzle.

The bend portion 85 has a bend angle, $\beta$, where the bend angle, $\beta$, is within 15° of the bend angle, $\alpha$. The bend angle, $\beta$, may be 60° to 110°. The second portion 87 of the second oxidant conduit 80 may be tilted upwards or downwards relative to the second portion 27 of the first oxidant conduit 20. The included angle for the second oxidant conduit 80 is defined between a straight section of the first portion 81 of the second oxidant conduit 80 and a straight section of the second portion 85 of the second oxidant conduit 80. The bend angle, $\beta$, is the supplementary angle to the included angle for the second oxidant conduit.

The second portion 87 of the second oxidant conduit 80 terminates in a nozzle and has a flow axis 82. The second portion 87 of the second oxidant conduit 80 is in fixed spaced relation to the second portion 27 of the first oxidant conduit 20. The optional second cooling fluid jacket 70 and the second oxidant conduit 80 may be welded together or otherwise attached as part of the burner assembly.

The bend angle, $\beta$, may be within 2° of the bend angle, $\alpha$. The flow axis 82 of the second portion 87 of the second oxidant conduit 80 may be substantially parallel to the flow axis 22 of the second portion 27 of the first oxidant conduit 20. With regard to the flow axis 82 and the flow axis 22, substantially parallel means spaced apart and equidistant to within 10% of the maximum spacing distance.

As shown in FIG. 1, the outlet end 29 of the second portion 27 of the first oxidant conduit 20 may protrude from the outlet 89 of the nozzle. The outlet end 29 may protrude from the outlet 89 by 0.2 cm to 3 cm. The nozzle of the second oxidant conduit 80 may be recessed relative to the outlet end 29 of the second portion 27 of the first oxidant conduit 20 to allow the first cooling jacket and/or the second portion 27 of the first oxidant conduit 20 to shield the nozzle from radiation from the flame and/or furnace.

Figure 4:
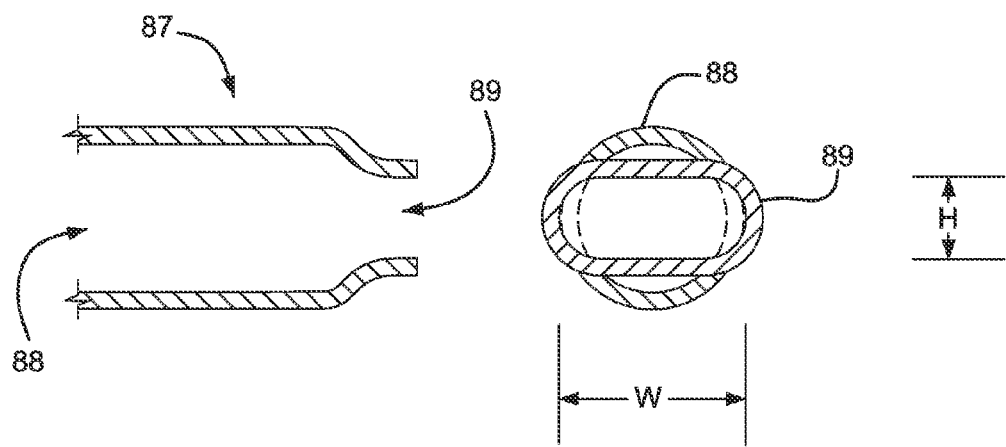
FIG. 4 shows an enlarged view of the discharge end of an underport oxidant staging lance.

As shown in FIG. 1 and in detail in FIG. 4, the nozzle of the second portion 87 of the second oxidant conduit 80 has an inlet 88, a transitional section and an outlet 89. The inlet 88 may have a circular cross section and a cross-sectional area, $A_{ni}$, and the outlet 89 has a non-circular cross section and a cross-sectional area, $A_{no}$. The outlet 89 of the nozzle may have a width-to-height ("W" to "H") ratio of 1.5 to 5. For the purposes of this disclosure, the width-to-height ratio of the outlet 89 is measured at the outlet face of the nozzle. The width is the larger dimension relative to the height.

For this nozzle, $$\frac{A_{ni}}{A_{no}}$$

may be 1.25 to 5. An area ratio greater than the stated lower limit is essential for minimizing oxidant flow non-uniformity at the nozzle outlet, which can lead to separated or reverse flow, increasing the risk of nozzle corrosion, pluggage and premature failure. An area ratio lower than the upper limit is needed to avoid either an excessively high second oxidant velocity or an unacceptably large second oxidant conduit.

The nozzle may have a convergent height and a divergent width. The convergent height helps to reduce the cross-sectional area, which is needed to prevent flow separation. The divergent width increases the breadth of the emerging secondary stream so that it is wider than the flame created by the first oxidant and fuel. This increases the uniformity of mixing beneath the staging oxidant and underside of the flame. The second portion 87 of the second oxidant conduit 80 may have a convex inner surface near the outlet 89. The convex inner surface allows for the rapid and smooth transition of the outlet flow to an orientation that is parallel with the main flow axis 82. The half-angle of the divergence in the width dimension may be 5° to 15°.

Nozzles are commonly described as "convergent" (narrowing down from a wide dimension to a smaller dimension in the direction of the flow) or "divergent" (expanding from a smaller dimension to a larger dimension in the direction of the flow). A de Laval nozzle has a convergent section followed by a divergent section and is often called a convergent-divergent nozzle.

Convergent nozzles accelerate subsonic fluids. If the nozzle pressure ratio is high enough the flow will reach sonic velocity at the narrowest point (i.e. the nozzle throat). In this situation, the nozzle is said to be "choked."

The nozzle described herein differs from the de Laval type nozzle. The de Laval type nozzle has a convergent section followed by a divergent section as contrasted to the instant nozzle having a divergent width and a convergent height.

The burner is designed to be inserted into a regenerator port as shown in FIG. 2. A hole must be cut into the regenerator port neck to provide a place for inserting the burner. The hole may be cut into the top, bottom (sill) or sides of the port neck. Preferably, the hole is cut into the bottom or floor of the port neck.

The burner may be inserted into the port through a hole cut into the bottom of the port neck, preferably in a substantially vertical orientation as shown in FIG. 2. The burner may include a mounting plate 95 to position and attach the burner to the port neck. The burner discharges the fuel and oxidant gas in a substantially horizontal plane into the furnace combustion space.

The burner may be operated in a variety of ways to control the temperature and heat flux distribution, both in the glass tank and in the regenerator port. This is achieved principally via adjustment in distribution of oxygen, the strategic use of which provide tailoring of flame length, luminosity and stability, and can also assist in cooling of the port surface.

The burner may be operated by introducing a gaseous fuel through the fuel conduit 40, introducing one or more oxidant gas streams through two or more of the first oxidant gas conduit 20, an in-port oxidant staging lance (second oxidant conduit 80), and an underport oxidant staging lance 90.

The present invention also relates to a furnace 100, a portion of which is shown in FIG. 2. While the furnace according to the present invention is shown with the burner according to FIG. 2, the burner according to FIG. 1 may also be used in conjunction with the furnace and one skilled in the art can clearly adapt the description for the burner according to FIG. 1. The furnace comprises a regenerator 125, a furnace combustion chamber 135 and a regenerator port neck 105 connecting the regenerator 125 to the furnace combustion chamber 135. The regenerator port neck 105 defines a port 110 and a port opening 115 in a wall 120 of the furnace 100. The furnace also comprises a burner according to the features as described above. The burner penetrates through the regenerator port neck 105 and into the port 110 and the burner is arranged to direct a fuel and an oxidant into the furnace 100.

The regenerator port neck 105 comprises port arch (top), port sill (bottom) and side walls, typically constructed of refractory brick. The regenerator port neck defines a passageway or port between a regenerator and the port opening or port mouth of the furnace. As used herein, the port is the passageway and is distinguished from the port opening.

A regenerator is a heat recovery device that utilizes regenerative heat transfer and is well-known in the art. Details of regenerators may be found in "Glass Furnaces, Design Construction and Operation," by Wolfgang Trier, translated by K. L. Loewenstein, Society of Glass Technology, Sheffield, UK, 2000, and "The Handbook of Glass Manufacture," $3^{rd}$ Ed. Vols. 1 & 2, by Fay Tooley (ed.), Ashlee Publishing Co. (New York), 1984.

As used herein, a regenerator port neck is any conduit that serves or previously served to transfer combustion air from a regenerator to a combustion space in a furnace.

The furnace may include a burner including any or all of the features described above for the burner.

In an embodiment, as shown in FIG. 1, an in-port staging lance may be used in the furnace.

In an embodiment, as shown in FIG. 2, a conduit 90 penetrates the furnace wall 120 at a position underneath the port opening 115 and is arranged to direct the oxidant into the furnace. Conduit 90 is an underport oxidant staging lance. The conduit is "underneath" the port opening if a line drawn vertically upward from the lance intersects the port. Vertically means straight up or down, plumb.

The furnace may include both an in-port oxidant staging lance and an underport oxidant staging lance.

The furnace also comprises a melting tank basin arranged below and adjoining the furnace combustion chamber, a charge end for introducing glass-forming ingredients into the melting tank basin, and a discharge end for withdrawing a glass product from the melting tank basin. Glass-forming ingredients are charged into the melting tank basin of the furnace and are melted by the heat from combustion flames in the furnace combustion chamber. The molten glass flows from the charge end to the discharge end and is withdrawn as a product from the furnace. The withdrawn molten glass undergoes forming operations to form the glass into sheet glass, fiberglass, containers or other desired product.

The furnace also comprises an exhaust port in a wall of the furnace to withdraw combustion products from the furnace combustion chamber. Fuel and oxidant are introduced via the burner in the regenerator port neck into the furnace combustion chamber, combust to form a flame and transfer heat to the glass-forming ingredients and molten glass. Combustion products from the reaction of the fuel and oxidant are removed from the furnace combustion chamber through the exhaust port.

The present invention also relates to a method of heating a furnace, for example during a regenerator repair. After operating a furnace for a long period of time, the heat transfer packing or checkers in the regenerator may become plugged up with condensed volatiles from the glass furnace or otherwise degraded. The furnace still needs to be heated when an air-fuel port is taken out of service to repair the regenerator. Preferably enough heat is provided to maintain glass production.

The method may also be used to extend the life of a furnace without repairing the degraded regenerator or for increasing the production rate of an existing furnace.

The burner described above may be used in a method for heating a furnace while a regenerator is repaired, to extend the life of the furnace without repairing the regenerator and/or to increase the production rate of an existing furnace.

The method of heating a furnace comprises obstructing a flow of air to the port, terminating a flow of a fuel to an air-fuel burner associated with the port, installing a burner as described above so that the burner penetrates through the regenerator port neck and into the port, passing a coolant through the first cooling fluid jacket, introducing a first oxidant gas into the furnace through the first oxidant conduit, and introducing the same fuel that was used during the previous air-fuel operation or a different fuel into the furnace through the fuel conduit.

The method also comprises combusting the selected fuel with the first oxidant gas to form combustion products and withdrawing the combustion products from the furnace combustion chamber through an exhaust.

During a regenerator repair, the flow of air through that portion of the regenerator checker pack will need to be stopped so that the degraded checkers can be removed and replacement checkers installed. The regenerator may be an open box design or compartmentalized design. The air flow may be obstructed or otherwised blocked at that bottom of the regenerator. It may also be desirable to obstruct or otherwise block the flow of air at the upstream end of the regenerator port.

The regenerator port neck may be cut or otherwise modified to provide a hole for installing the burner. The hole in the regenerator port neck may be in the bottom or sill of the regenerator port neck as shown in FIG. 2. The hole may also be cut into either of the sides of the regenerator port neck or the arch or top of the regenerator port neck.

The burner may be installed so that the burner penetrates through the regenerator port neck and into the port. The distance of the outlet end of the second portion of the first oxidant conduit and the distance outlet end of the second portion of the fuel conduit from any of the port neck walls may be set by the position of the mounting plate 95.

Generally a coolant, preferably water, will be passed through the first cooling fluid jacket during the installation of the burner into the regenerator port neck to prevent overheating of the burner while it is being installed.

Once installed, a first oxidant gas will be introduced into the furnace through the first oxidant conduit and a fuel will be introduced into the furnace through the fuel conduit. The fuel may be the same fuel that was used for the previous air-fuel operation or a different fuel may be used if desired. The fuel may be natural gas.

The method may further comprise introducing the first oxidant gas or a second oxidant gas into the furnace through a second oxidant conduit.

The method may further comprise introducing a quantity of air through the regenerator port. The air may come through the regenerator or from another source. The air so introduced has at least three beneficial effects. First, it purges the port of recirculated furnace gases and particulate, thus minimizing corrosion and particulate buildup within the port. Secondly it adds momentum to the flame. Finally it permits the reduction of oxidant flow to the burner, which in turn lowers operating costs and slows the combustion rate near the burner nozzle. The slower combustion rate generally extends and intensifies the luminous region of the flame, thereby increasing radiant heat transfer. Up to 25% of the stoichiometric oxygen requirement for the burner may be supplied by air flow through the port. With some of the oxygen requirement being provided by air through the port, 95% to as little as about 75% of the stoichiometric amount of oxidant required for complete combustion of fuel to the burner may be provided by the first oxidant gas and/or the second oxidant gas.

The regenerator may then be repaired while the operation of the burner provides heating to the furnace and glass production is continued.

Otherwise the furnace may continue operation in this mode without repairing the regenerator until the end of the furnace campaign.

Some limits for the parameter ranges of the burner were determined by geometric (ie. available space) considerations of the burner and the port of a regenerative glass furnace. To assist in determining other limits for these ranges, Computational Fluid Dyanamics (CFD) modeling was used, as described in the following example.

Example

CFD modeling was used to isolate and examine the effects of design and operating parameters on burner fluid mechanical and thermal phenomena. A burner and associated second oxidant as illustrated in FIG. 1 served as the base modeling configuration. Parameters varied during the modeling effort, along with their respective ranges, are provided in Table 1. Note that while the staging oxidant flow, that is the percent of the total (first plus second) oxidant flow, is not a design parameter for the burner, it was included herein since its variation within the example helps to further highlight the effects of the other parameters. The fuel was assumed to be natural gas, which is modeled as 100% methane.

For practical reasons, only the most salient CFD results are presented.

TABLE 1

| Parameter | Minimum | Maximum |
|---|---|---|
| Burner Non-Dimensional Length, L/D | 0.8 | 2.7 |

TABLE 1-continued

| Parameter | Minimum | Maximum |
|---|---|---|
| First Oxidant Flow Cross-Sectional Area Ratio; $\frac{A_i}{A_o}$ | 1.0 | 1.9 |
| Fuel Flow Cross-Sectional Area Ratio; $\frac{A_{fi}}{A_{fo}}$ | 1.0 | 1.9 |
| Second Oxidant Conduit Flow Cross-Sectional Area Ratio; $\frac{A_{ni}}{A_{no}}$ | 1.0 | 1.55 |
| Staging Oxidant Flow (% of total oxidant flow) | 20% | 80% |

The varying of burner non-dimensional length, L/D, was carried out with the first oxidant and fuel area flow cross-sectional area ratios at their maximum values (see Table 1). Results are summarized in FIGS. 6 through 9.

Figure 6:
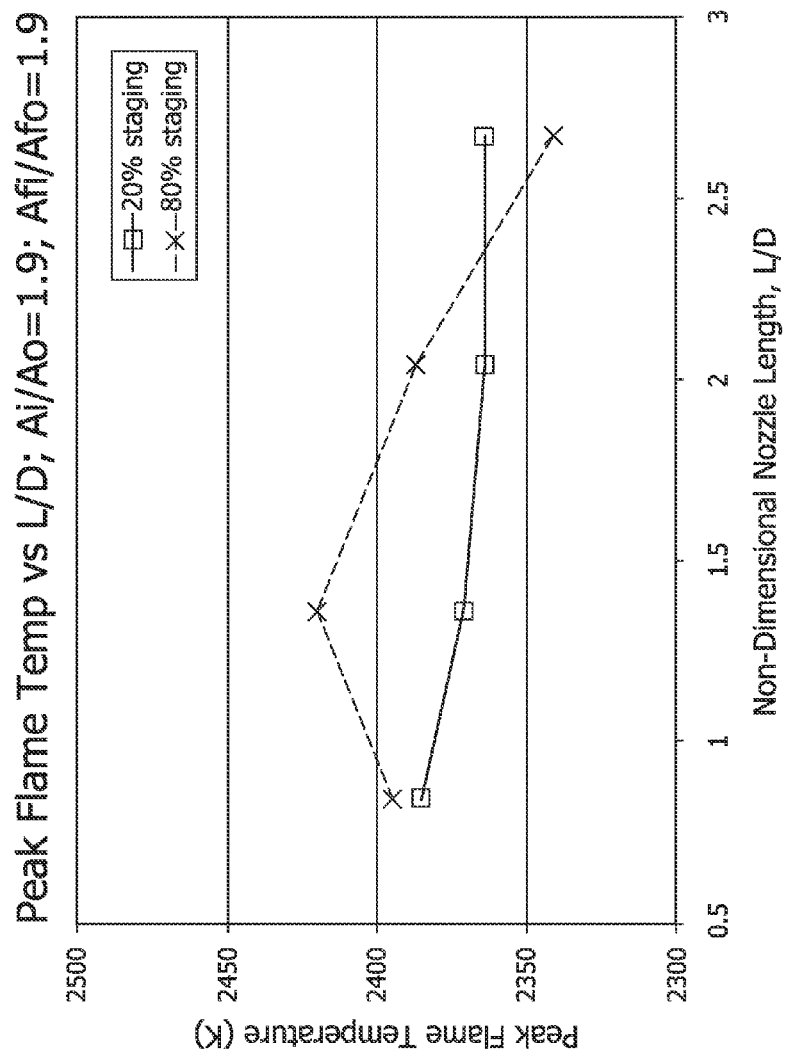
FIG. 6 is a plot of modeling results showing peak flame temperature as a function of non-dimensional nozzle length.

For example, the effect of L/D on peak flame temperature is illustrated in FIG. 6. Note that while the trend for the 20% staging case shows a gradual and relatively small increase in temperature as L/D is reduced, the peak flame temperature for the 80% staging case increases by nearly 100 K for 80% oxidant as L/D is decreased from 2.7 to 1.4, then declines as L/D is further decreased to 0.8. Since the peak flame temperature increase is less than 100 K for L/D ranging from 0.8 through 2.7 and L/D greater than 2.7 would have a peak flame temperature even lower, L/D from 0.8 to 7 is suitable. The burner is operable over an L/D range from 0.8 to 7.

Figure 7:
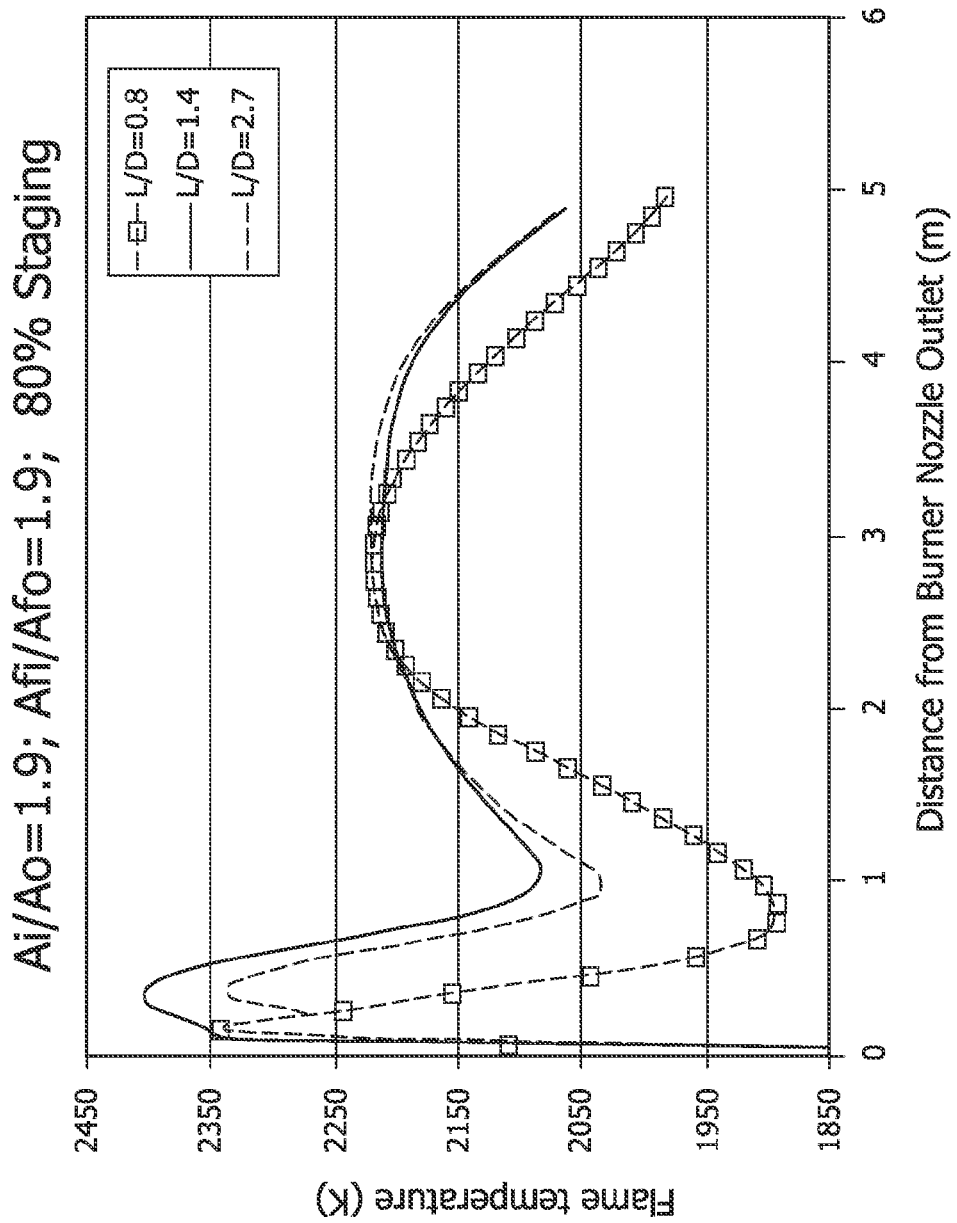
FIG. 7 is a plot of modeling results showing flame temperature as a function of distance from the burner nozzle outlet.

A closer examination of the flame temperature for the cases involving 80% staging is given in FIG. 7, which compares the flame temperature distribution for L/D equal to 0.8, 1.4 and 2.7. It will first be noted that the peak temperature for all three cases occurs relatively close to the burner nozzle; hence, excursions in the peak value potentially expose the burner metal to high temperature damage. Further, for L/D equal to 1.4 and 2.7, the flame temperature initially increases, reaching a peak value at a distance of approximately 0.5 m from the nozzle outlet. However, for L/D equal to 0.8, the peak temperature occurs at a distance of less than 0.2 m from the nozzle outlet, thus further increasing the nozzle overheating risk. It is also of interest that the flame temperature for the L/D equal 0.8 case immediately declines after the peak is achieved, reaching a local minimum that is between 150 and 200K lower than that which occurs for the other two cases. These characteristics suggest a more radical shift in flame properties occurring between L/D equal to 1.4 and 0.8 than occurred from L/D equal to 2.7 and 1.4.

An explanation for the shift in flame properties can be deduced from the nozzle outlet velocity profiles of the L/D equal to 1.4 and 0.8 cases provided in FIGS. 8a and 8b, respectively. In particular, although the trajectory of the fuel/first oxidizer mixture remains essentially unchanged for the two cases, the trajectory of the second oxidizer is significantly altered as L/D is varied. That is, for L/D equal to 1.4, the second oxidant trajectory is essentially parallel to that of the first oxidant/fuel stream. However, as L/D is reduced to 0.8, the staging oxidant flow, having insufficient development length within the second oxidant nozzle, is angled upwards towards the main flame by approximately 4 degrees. This leads to rapid convergence between the flame and secondary oxidant, which when combined with the relatively large volume of second oxidant (80% of total oxidant as staging oxidant), generates accelerated mixing near the burner tip, causing the peak temperature to be located closer to the nozzle and the subsequent minimum temperature to be lower than for the other cases. The practical effect of these findings is that when the burner comprises a second oxidant conduit, the minimum value of L/D should be greater than or equal to 1.4. However, since the characteristics of the fuel/first oxidant stream are not largely affected by the change from L/D equal to 1.4 to 0.8, when the burner does not comprise the second oxidant conduit, the minimum value of L/D should be greater than or equal to 0.8.

Figure 9:
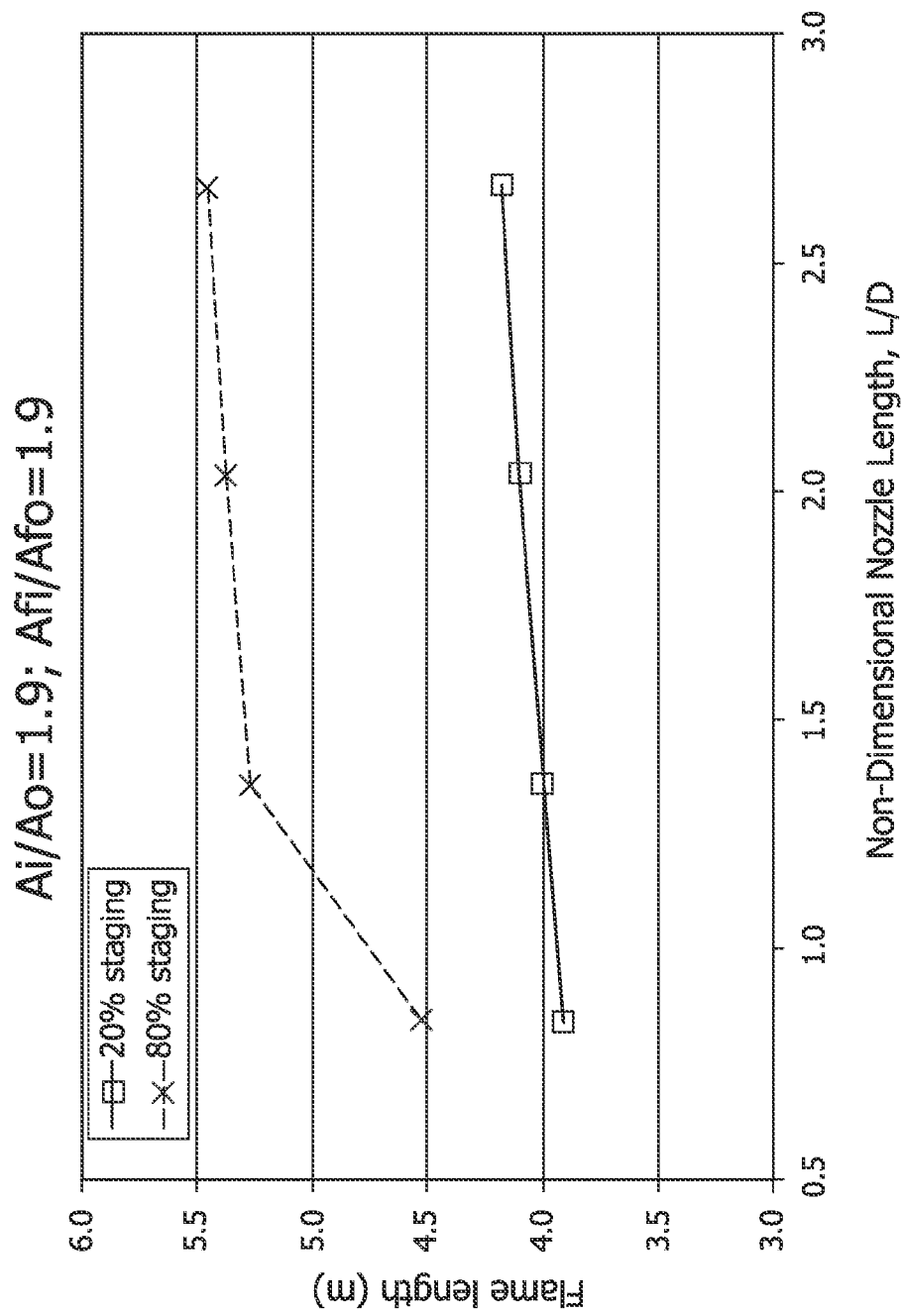
FIG. 9 is a plot of modeling results showing flame length as a function of non-dimensional nozzle length.

The effect of L/D on flame length, illustrated in FIG. 9, reinforces the conclusions drawn from FIGS. 6 through 8. This figure shows how the reduction of L/D leads to shortening of the flame, presumably due to the insufficient development of reactant velocity profiles within the burner and staging lance nozzles which lead to accelerated mixing. The flame shortening effect of L/D between 1.4 and 0.8 for the 80% oxidant staging case is particularly severe and can be again be attributed to the rapid convergence between the main and secondary nozzle flows previously described.

Figure 10:
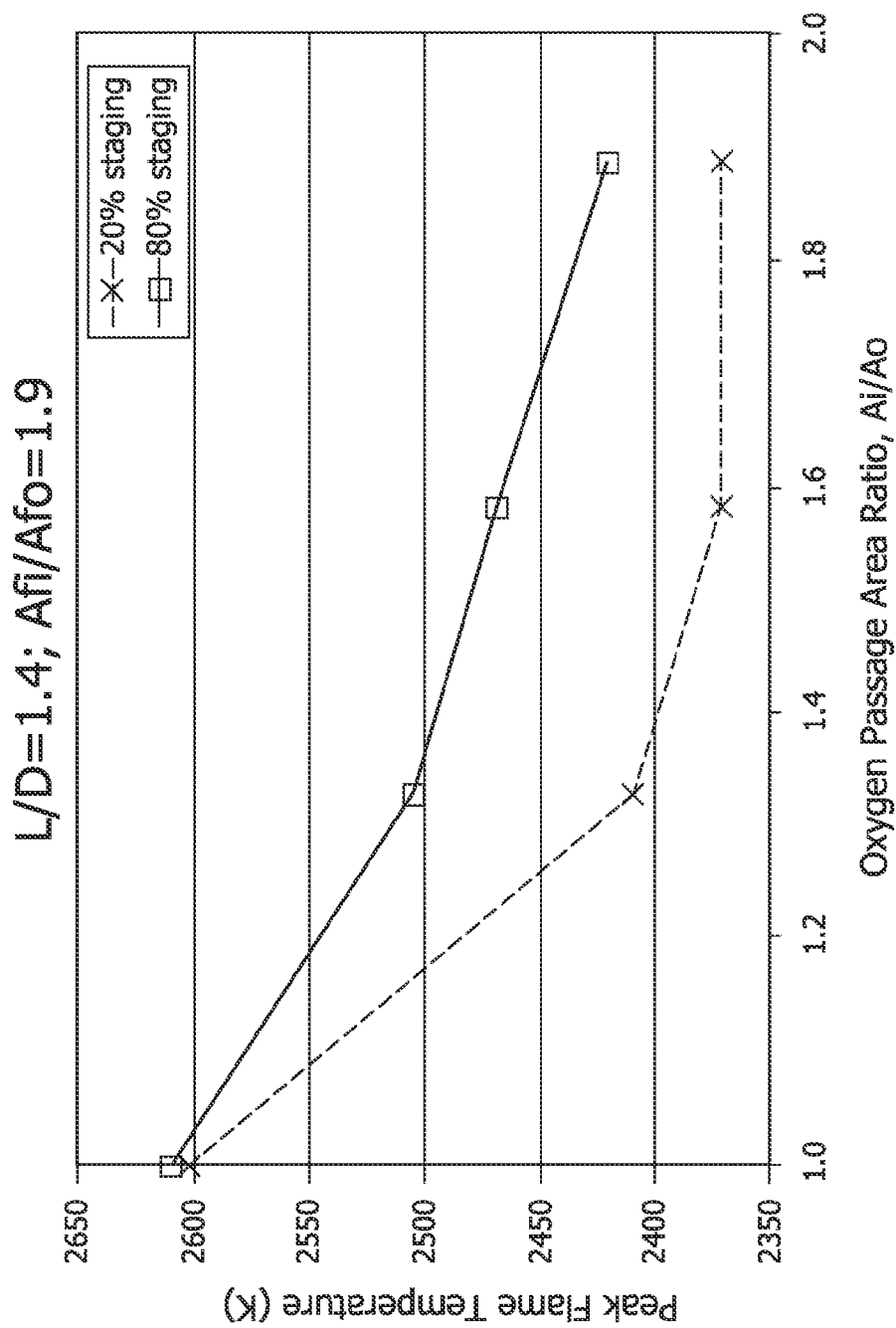
FIG. 10 is a plot of modeling results showing temperature as a function of oxygen passage area ratio.
Figure 11:
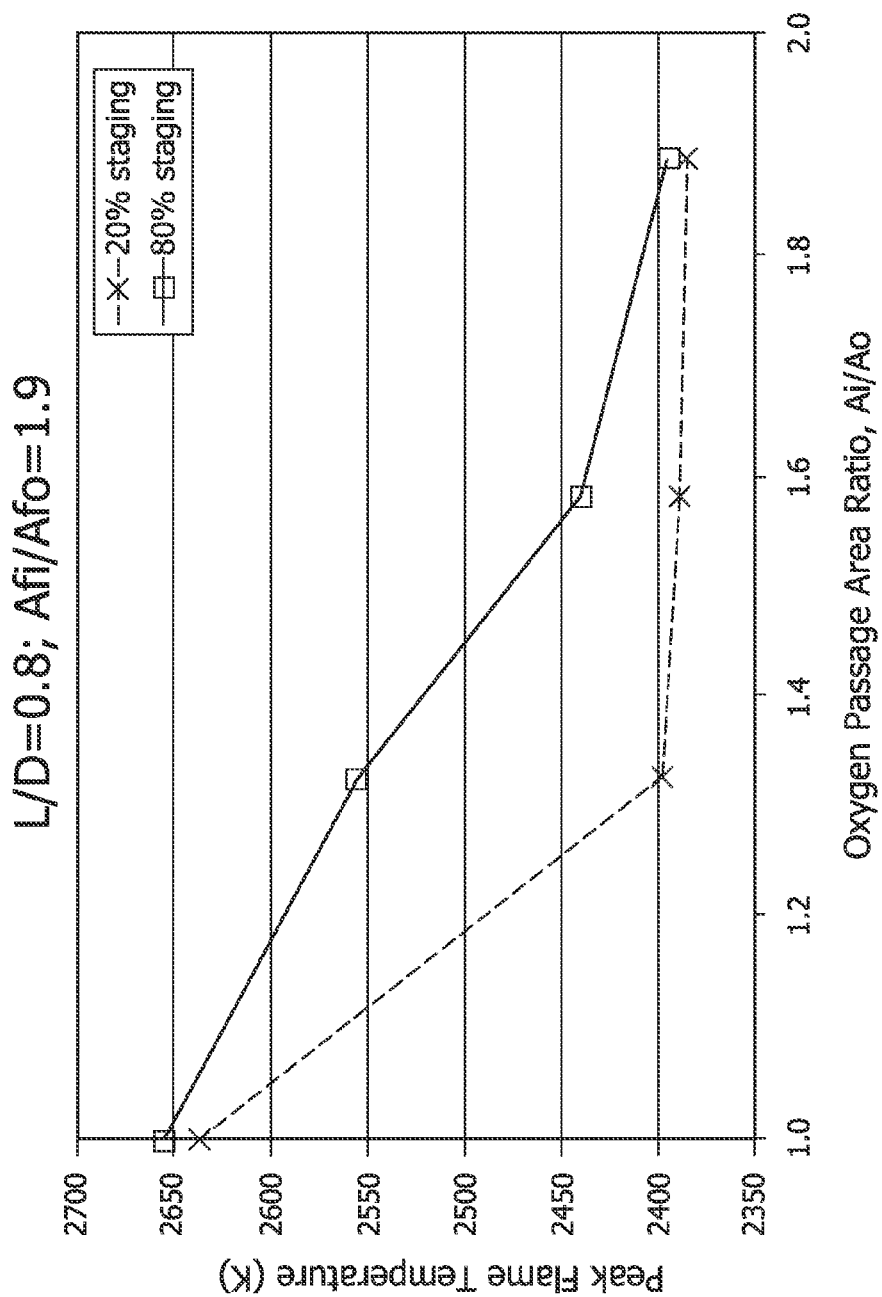
FIG. 11 is a plot of modeling results showing temperature as a function of oxygen passage area ratio.

Variation of the first oxidant area ratio was carried out with burner non-dimensional lengths, L/D, of 0.8 and 1.4. Peak flame temperature was shown to be sensitive to first oxidizer area ratio. FIG. 10 shows the peak temperature as a function of $$\frac{A_i}{A_o}$$

for L/D equal to 1.4, and for 20% and 80% oxidant staging. A peak temperature increase of the order of 190 K occurs for 80% staging while a peak temperature increase of 230 K occurs for 20% staging as the area ratio $$\frac{A_i}{A_o}$$

is reduced from 1.9 to 1.0. For the latter case, the peak temperature increase steepens as $$\frac{A_i}{A_o}$$

is lowered from 1.3 to 1.0. Similar results are presented for the case of L/D equal to 0.8 in FIG. 11. As in FIG. 10, the peak temperature increases sharply as $$\frac{A_i}{A_o}$$

is reduced below 1.3. For all cases the highest peak flame temperature reaches a value in the range of 2600 to 2650 K at $$\frac{A_i}{A_o}$$

equal to 1.0.

Figure 12:
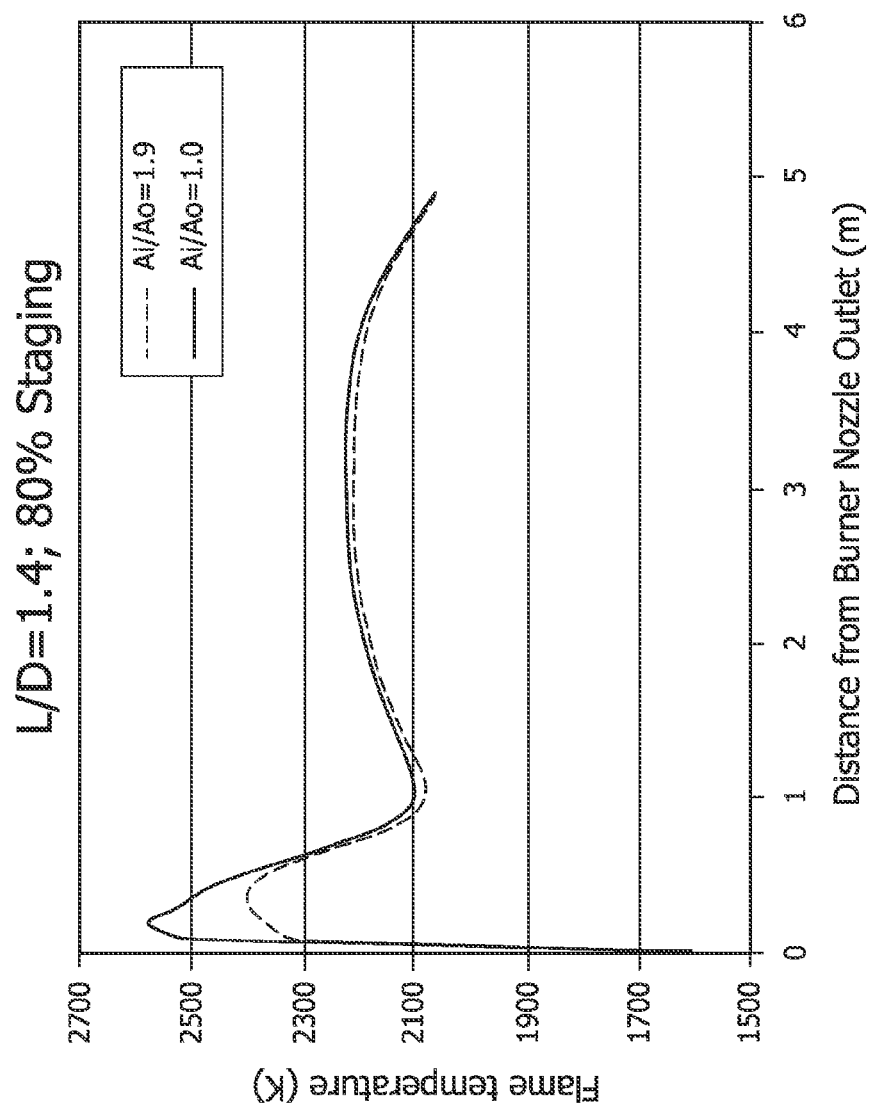
FIG. 12 is a plot of modeling results showing flame temperature as a function of distance from the burner nozzle outlet.

Additional details comparing the flame temperature distributions for the 80% staging case with $$\frac{A_i}{A_o}$$

equal to 1.0 and 1.9 are presented in FIG. 12. The temperature distributions for both cases again show the characteristic peak value near the burner outlet. Note however that the location of the peak shifts from a distance of approximately 0.4 m from the burner nozzle at $$\frac{A_i}{A_o}$$

equal to 1.9 to approximately 0.2 m from the nozzle for $$\frac{A_i}{A_o}$$

equal to 1.0. Since it is the combination of peak temperature and peak location that define the relative risk of nozzle overheating, it is concluded that values of $$\frac{A_i}{A_o}$$

less than 1.3 should be avoided.

The mechanism by which the effect of varying the oxidant area ratio alters flame properties is through the first oxidant exit velocity profile. That is, decreasing the ratio $$\frac{A_i}{A_o}$$

increases the maldistribution of first oxidant flow at the outlet of the burner nozzle, thereby generating excess turbulence and shear that increases peak flame temperature and shortens flame length. One way to quantify the velocity maldistribution is to calculate a velocity deviation, defined as the standard deviation of the local velocity from the mean value of the cross-section. Defined as such, a higher velocity deviation corresponds to a greater degree of non-uniformity which, for the present invention, leads to an undesirable higher rate of mixing between fuel and first oxidant. The velocity deviations corresponding to the first oxidizer area ratio $$\frac{A_i}{A_o}$$

equal to 1.0, 1.3 and 1.9; L/D equal to 1.4; 20% staging, are listed in Table 2. The magnitude of the deviations, normalized as a percent of the mean cross-sectional velocity, indicate a doubling of the first oxidant non-uniformity as the area ratio $$\frac{A_i}{A_o}$$

is reduced from 1.9 to 1.0. Moreover, it shows a relatively small increase in velocity deviation as $$\frac{A_i}{A_o}$$

is reduced from 1.9 to 1.3, compared with a fairly large increase as $$\frac{A_i}{A_o}$$

is lowered from 1.3 to 1.0, further indicating the need to maintain the first oxidizer area ratio $$\frac{A_i}{A_o}$$

at or above 1.3.

TABLE 2

| First Oxidizer Area Ratio $\frac{A_i}{A_o}$ | Velocity Deviation (% of mean velocity) |
|---|---|
| 1.0 | 21.5 |
| 1.3 | 13.9 |
| 1.9 | 10.7 |

Concerning the fuel area ratio, $$\frac{A_{fi}}{A_{fo}},$$

decreasing this parameter over the range of 1.9 to 1.0 has a qualitatively similar effect on peak flame temperature as the change in first oxidant area ratio (over the same limits). The magnitude of the effect, however, is smaller. For example, with L/D equal to 0.8, the reduction of fuel area ratio from 1.9 to 1.0 yielded a 70 K increase in peak flame temperature, whereas the flame temperature increase produced by the same reduction in first oxidizer area ratio was 250 K (see FIG. 11).

The lower sensitivity of the flame characteristics to fuel nozzle area ratio compared to that of the first oxidant area ratio is traceable to the fact that the fuel nozzle outlet velocity profile is not as sensitive to area ratio changes as is the first oxidant outlet velocity profile. As documented in Table 3, the fuel velocity deviations at the nozzle outlet for fuel area ratio $$\frac{A_{fi}}{A_{fo}}$$

equal to 1.0 and 1.9 are less than half the comparable values for the first oxidant (see Table 2). Fuel area ratios $$\frac{A_{fi}}{A_{fo}}$$

less than 1.0 are undesirable as they are prone to unstable flow separation effects. Hence, based on CFD modeling any fuel nozzle area ratio, $$\frac{A_{fi}}{A_{fo}},$$

greater than or equal to 1.0 is acceptable in this invention. However, measurements and observations of flame properties made during laboratory prototype tests indicate that burner performance is further improved through the use of a fuel area ratio greater than 1.37, and also with a concave to convex contour as illustrated in FIG. 3.

TABLE 3

| Fuel Area Ratio $\frac{A_{fi}}{A_{fo}}$ | Velocity Deviation (% of mean velocity) |
|---|---|
| 1.0 | 9.4 |
| 1.9 | 4.8 |

The flow cross-sectional area ratio, $$\frac{A_{ni}}{A_{no}},$$

of the second oxidant conduit strongly influences the second oxidant velocity distribution leaving the nozzle which, in turn, can affect both the performance and durability of the burner system. For the conditions of interest to this invention, $$1.0 \le \frac{A_{ni}}{A_{no}} \le 1.55,$$

Figure 13:
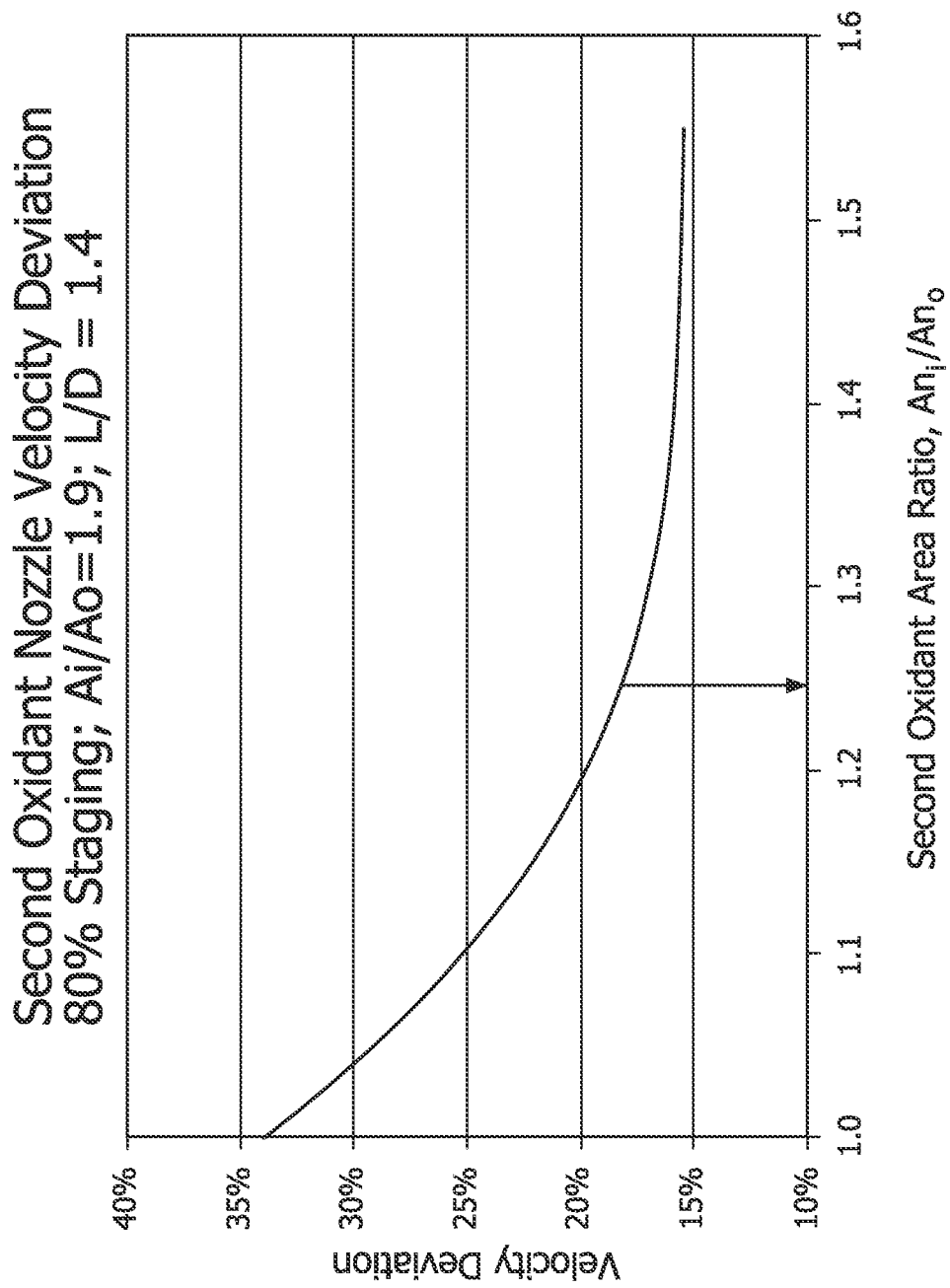
FIG. 13 is a plot of modeling results showing second oxidant velocity deviation as a function of second oxidant passage area ratio.

CFD modeling results verified the strong effect on velocity distribution. FIG. 13 shows that the velocity deviation of the secondary oxidant increases sharply as the area ratio, $$\frac{A_{ni}}{A_{no}},$$

is lowered below a value of approximately 1.25, as indicated by the increased slope in the curve. While the results suggest the effect on combustion performance is relatively minor over this range, the breakdown in the nozzle outlet velocity profile at area ratios below this critical value leads to regions of very low outlet velocity which are prone to instabilities that can lead to separated or reverse flow. This increases the risk of nozzle corrosion and pluggage, and is likely to lead to the need for more frequent maintenance and higher failure rates. As such, the minimum acceptable area ratio $$\frac{A_{ni}}{A_{no}}$$

for the second oxidant nozzle of this invention is 1.25.

The invention claimed is:
1. A burner comprising:
a first cooling fluid jacket with an outer equivalent diameter, D;
a first oxidant conduit disposed in fixed spaced relation to and generally concentrically within the first cooling fluid jacket, the first oxidant conduit having:
an inlet;
a first portion downstream of the inlet of the first oxidant conduit;
a bend portion downstream of the first portion of the first oxidant conduit, the bend portion of the first oxidant conduit having a bend angle, a, of 45° to 120°; and
a second portion downstream of the bend portion of the first oxidant conduit, the second portion of the first oxidant conduit terminating in an outlet end and having a flow axis and a length, L, measured from the intersection of the centerline of the first portion and the centerline of the second portion of the first conduit; and
a fuel conduit having:
an inlet;
a first portion downstream of the inlet of the fuel conduit, wherein the first portion of the fuel conduit is disposed in fixed spaced relation to and generally concentrically within the first portion of the first oxidant conduit;
a bend portion wherein the bend portion of the fuel conduit is disposed in fixed spaced relation to and generally concentrically within the bend portion of the first oxidant conduit; and
a second portion terminating in an outlet end and having a flow axis wherein the second portion of the fuel conduit is disposed in fixed spaced relation to and generally concentrically within the second portion of the first oxidant conduit thereby defining an oxidant passage between the second portion of the fuel conduit and the second portion of the first oxidant conduit;
wherein the oxidant passage has an inlet section, a transition section downstream of the inlet section, and an outlet section downstream of the transition section, wherein the inlet section has a cross-sectional area, $A_i$, the outlet section has a cross-sectional area, $A_o$, and wherein

$$0.8 \le \frac{L}{D} \le 7 \text{ and } 1.3 \le \frac{A_i}{A_o} \le 5.$$

2. The burner of claim 1 wherein the second portion of the fuel conduit defines a fuel passage wherein the fuel passage has an inlet section, a transition section downstream of the inlet section, and an outlet section downstream of the transition section, wherein the inlet section of the second portion of the fuel conduit has a cross sectional area, $A_{fi}$, and the outlet section of the second portion of the fuel conduit has a cross section area, $A_{fo}$, wherein $$1.0 < \frac{A_{fi}}{A_{fo}} \leq 5.$$

3. The burner of claim 1 wherein the second portion of the fuel conduit defines a fuel passage wherein the fuel passage has an inlet section, a transition section downstream of the inlet section, and an outlet section downstream of the transition section, wherein the inlet section of the second portion of the fuel conduit has a cross sectional area, $A_{fi}$, and the outlet section of the second portion of the fuel conduit has a cross section area, $A_{fo}$, wherein $$1.37 \leq \frac{A_{fi}}{A_{fo}} \leq 5.$$

4. The burner of claim 2 wherein the second portion of the fuel conduit has a concave inner surface and a convex inner surface in the transition section of the fuel passage, wherein the convex inner surface of the fuel conduit is downstream of the concave inner surface of the fuel conduit.

5. The burner of claim 1 wherein the outlet end of the second portion of the first oxidant conduit protrudes from the outlet end of the second portion of the fuel conduit by 0.2 cm to 3 cm.

6. The burner of claim 1 further comprising:
a second oxidant conduit disposed in fixed spaced relation to and generally concentrically within at least one of the first cooling fluid jacket and a second cooling fluid jacket, the second oxidant conduit having:
an inlet;
a first portion downstream of the inlet of the second oxidant conduit;
a bend portion downstream of the first portion of the second oxidant conduit, the bend portion of the second oxidant conduit having a bend angle, $\beta$, the bend angle $\beta$ within 15° of the bend angle $\alpha$; and
a second portion downstream of the bend portion of the second oxidant conduit, the second portion of the second oxidant conduit terminating in a nozzle and having a flow axis, the second portion of the second oxidant conduit in fixed spaced relation to the second portion of the first oxidant conduit.

7. The burner of claim 6 wherein the bend angle, $\beta$ is within 2° of the bend angle, $\alpha$, and wherein the flow axis of the second portion of the second oxidant conduit is substantially parallel to the flow axis of the second portion of the first oxidant conduit.

8. The burner of claim 6 wherein the nozzle has an inlet and an outlet and wherein the outlet end of the second portion of the first oxidant conduit protrudes from the outlet of the nozzle of the second portion of the second oxidant conduit by 0.2 cm to 3 cm.

9. The burner of claim 6 wherein the nozzle of the second portion of the second oxidant conduit has an inlet and an outlet wherein the inlet has a circular cross section and a cross-sectional area, $A_{ni}$, and the outlet has a non-circular cross section and a cross-sectional area, $A_{no}$, wherein the outlet of the nozzle has a width-to-height ratio of 1.5 to 5.

10. The burner of claim 9 wherein $$1.25 \leq \frac{A_{ni}}{A_{no}} \leq 5.$$

11. The burner of claim 9 wherein the nozzle has a convergent height and a divergent width.

12. The burner of claim 9 wherein the nozzle has a convex surface transitioning between the circular cross section and the non-circular cross section.

13. The burner of claim 1 wherein the second portion of the first oxidant conduit has a convex inner surface in the transition section of the oxidant passage.

14. The burner of claim 1 wherein the second portion of the fuel conduit has a concave outer surface in the transition section of the oxidant passage.

15. The burner of claim 6 wherein 60°<$\alpha$<110° and 60°<$\beta$<110°.

16. The burner of claim 1 wherein the second portion of the first oxidant conduit has a circular cross section.

17. The burner of claim 1 wherein the second portion of the fuel conduit has a circular cross section.

18. The burner of claim 1 wherein the flow axis of the second portion of the first oxidant conduit is straight and is substantially parallel or substantially coincident with the flow axis of the second portion of the fuel conduit.

19. A furnace comprising:
a regenerator;
a furnace combustion chamber;
a regenerator port neck connecting the regenerator to the furnace combustion chamber, the regenerator port neck defining a port and a port opening in a wall of the furnace; and
a burner according to any one of claims 1 to 18 the burner penetrating through the regenerator port neck and into the port, the burner arranged to direct a fuel and an oxidant into the furnace combustion chamber.

20. A furnace comprising:
a regenerator;
a furnace combustion chamber;
a regenerator port neck connecting the regenerator to the furnace combustion chamber, the regenerator port neck defining a port and a port opening in a wall of the furnace; and
a burner according to claim 6, wherein the first cooling jacket, the first oxidant conduit and the fuel conduit penetrate through the regenerator port neck and into the port, the first oxidant conduit arranged to direct an oxidant into the furnace, the fuel conduit arranged to direct a fuel into the furnace, and wherein the second oxidant conduit penetrates the furnace wall at a position underneath the port opening, the second oxidant conduit arranged to direct the oxidant into the furnace.

21. A method of heating a furnace, the furnace having a regenerator port neck connecting a regenerator to a furnace combustion chamber, the regenerator port neck defining a port and a port opening in a wall of the furnace, the method comprising:
obstructing a flow of air to the port;
terminating a flow of a fuel to an air-fuel burner associated with the port;
installing a burner defined by any one of claims 1 to 18 so that the burner penetrates through the regenerator port neck and into the port;

passing a coolant through the first cooling fluid jacket and, if present, through the second cooling fluid jacket;

introducing a first oxidant gas into the furnace combustion chamber through the first oxidant conduit;

introducing the fuel or another fuel into the furnace combustion chamber through the fuel conduit;

combusting the fuel or the other fuel with the first oxidant gas to form combustion products; and withdrawing the combustion products from the furnace combustion chamber through an exhaust.

22. The method of claim 21 further comprising continuing air flow through the port in an amount greater than 5% to less than or equal to 25% of the stoichiometric air required for combustion of the fuel or the other fuel passing through the burner.

23. The method of claim 22 wherein the first oxidant gas comprises 28 vol. % to 100 vol. % oxygen.

24. The method of claim 22 wherein the burner is defined by any one of claims 6 to 12 and further comprising:

introducing the first oxidant gas or a second oxidant gas into the furnace combustion chamber through the second oxidant conduit.

25. The method of claim 24 wherein the second oxidant gas comprises 28 vol. % to 100 vol. % oxygen.

* * * * *

UNITED STATES PATENT AND TRADEMARK OFFICE
CERTIFICATE OF CORRECTION

PATENT NO. : 9,221,704 B2
APPLICATION NO. : 13/296624
DATED : December 29, 2015
INVENTOR(S) : D'Agostini et al.

Page 1 of 1

It is certified that error appears in the above-identified patent and that said Letters Patent is hereby corrected as shown below:

On the title page item [86], should read --a 371 of international PCT Application No. PCT/US2010/037076 filed June 2, 2010, which is a Nonprovisional of Provisional Application No. 61/184,944 filed June 8, 2009.--

Signed and Sealed this
Twenty-sixth Day of July, 2016

Michelle K. Lee
*Director of the United States Patent and Trademark Office*